United States Patent
Shi

(10) Patent No.: US 12,432,658 B2
(45) Date of Patent: Sep. 30, 2025

(54) INFORMATION PROCESSING METHOD AND APPARATUS BASED ON DCP IN DRX SHORT CYCLE MODE, AND COMMUNICATION DEVICE AND STORAGE MEDIUM

(71) Applicant: Beijing Xiaomi Mobile Software Co., Ltd., Beijing (CN)

(72) Inventor: Rao Shi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 392 days.

(21) Appl. No.: 18/003,197

(22) PCT Filed: Aug. 12, 2020

(86) PCT No.: PCT/CN2020/108713
§ 371 (c)(1),
(2) Date: Dec. 23, 2022

(87) PCT Pub. No.: WO2022/032527
PCT Pub. Date: Feb. 17, 2022

(65) Prior Publication Data
US 2023/0254771 A1    Aug. 10, 2023

(51) Int. Cl.
*H04W 52/02* (2009.01)

(52) U.S. Cl.
CPC ... *H04W 52/0232* (2013.01); *H04W 52/0274* (2013.01)

(58) Field of Classification Search
CPC ......... H04W 52/0232; H04W 52/0274; H04W 52/0216; H04W 52/0229; H04W 52/0235;
(Continued)

(56) References Cited

U.S. PATENT DOCUMENTS 12,028,810 B2 * 7/2024 Shi ............... H04W 52/0232
2009/0238105 A1 * 9/2009 Wu ............... H04W 52/0216
370/311
(Continued)

FOREIGN PATENT DOCUMENTS

CN    101079183 A    11/2007
CN    101606420 A    12/2009
(Continued)

OTHER PUBLICATIONS

Combined Chinese Office Action and Search Report issued Feb. 4, 2024, in corresponding Chinese Patent Application No. 202080001899.2 (with English Translation), 11 pages.
(Continued)

*Primary Examiner* — Robert C Scheibel
(74) *Attorney, Agent, or Firm* — Oblon, McClelland, Maier &Neustadt, L.L.P.

(57) ABSTRACT

Provided in the embodiments of the present disclosure is an information processing method which can be performed by terminal. The method can include receiving, in a Discontinuous Reception (DRX) short cycle mode, Downlink Control Information (DCI) for power saving (DCP), and switching from the DRX short cycle mode to a DRX long cycle mode in response to that the DCP includes a first indication. The receiving of the DCP including the first indication corresponds to that a wake up signal (WUS) corresponding to the DCP is not considered to be detected by the terminal.

17 Claims, 10 Drawing Sheets

(58) Field of Classification Search
CPC ... H04W 52/02; H04W 52/028; H04W 76/28; Y02D 30/70
See application file for complete search history.

(56) References Cited

U.S. PATENT DOCUMENTS

| | | | | |
|---|---|---|---|---|
| 2012/0140691 | A1* | 6/2012 | Wu | H04W 72/23 370/311 |
| 2020/0351777 | A1* | 11/2020 | Kim | H04W 72/23 |
| 2022/0232478 | A1* | 7/2022 | Huang | H04W 52/028 |
| 2022/0264462 | A1* | 8/2022 | Bao | H04W 52/0274 |

FOREIGN PATENT DOCUMENTS

| | | |
|---|---|---|
| CN | 109219116 A | 1/2019 |
| CN | 109981232 A | 7/2019 |
| CN | 110199550 A | 9/2019 |
| CN | 110520840 A | 11/2019 |
| CN | 110831262 A | 2/2020 |
| CN | 111432460 A | 7/2020 |
| CN | 111436098 A | 7/2020 |
| WO | WO 2018/210135 A1 | 11/2018 |
| WO | WO 2020/140815 A1 | 7/2020 |

OTHER PUBLICATIONS

Notice of Allowance issued May 13, 2024, in corresponding Chinese Patent Application No. 202080001899.2 (with English Translation), 22-25 therein, 10 pages.

Nokia, Nokia Shanghai Bell, "On short DRX cycle applicability for DCP", 3GPP TSG-RAN WG2 Meeting #109e, Elbonia, R2-2001040, Feb. 24-Mar. 6, 2020, 3 pages.

Vivo, "Remaining issues for DCP", 3GPP TSG-RAN WG2 Meeting #110-e, Electronic, R2-2004642, Jun. 1-12, 2020, 7 pages.

Nokia, Nokia Shanghai Bell, "On DRX ambiguous period", 3GPP TSG-RAN WG2 Meeting #109e, Elbonia, R2-2001037, Feb. 24-Mar. 6, 2020, 3 pages.

Liu Tao, "DRX power saving mode of LTE", Telecommunications Engineering Technology and Standardization, Feb. 13, 2020, 6 pages (with English Abstract).

International Search Report with English translation mailed on Apr. 27, 2021 in PCT/CN2020/108713 filed on Aug. 12, 2020 (4 pages).

Combined Chinese Office Action and Search Report issued on Jul. 31, 2023 in Chinese Patent Application No. 202080001899.2 (with English Translation of Category of Cited Documents), 7 pages.

* cited by examiner

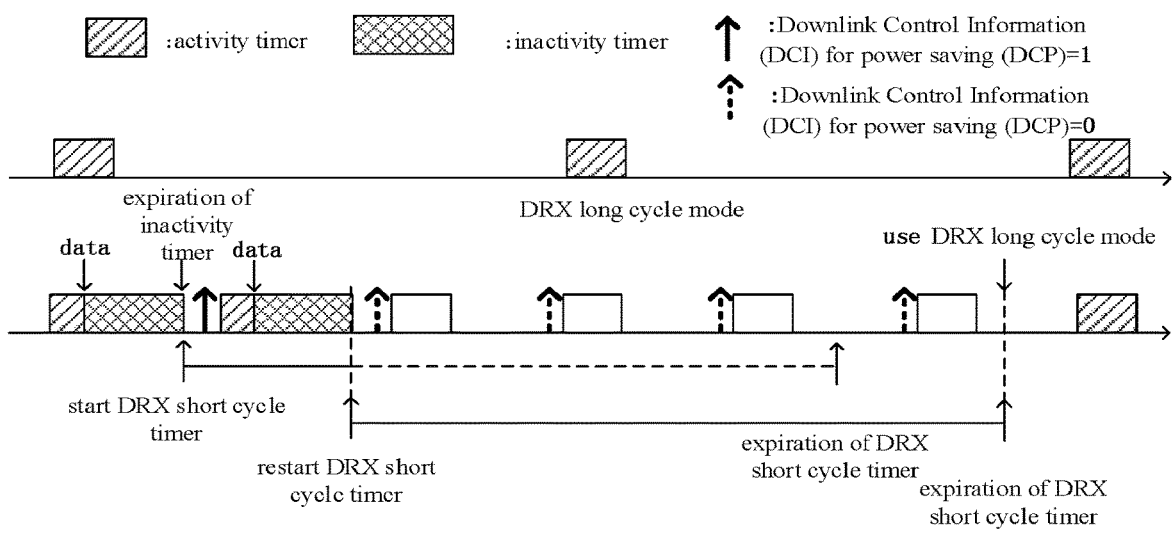

FIG. 3

base station

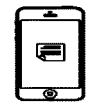
terminal

Step 401, DCP is received in a DRX short cycle mode

Step 402, the terminal switches from the DRX short cycle mode to a DRX long cycle mode in response to that the DCP includes a first indication. Receiving of the DCP including the first indication by the terminal corresponds to that a wake up signal (WUS) corresponding to the DCP is not considered to be detected by the terminal.

FIG. 4 base station 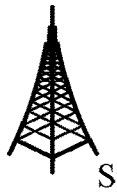  terminal

Step 111, DCP is sent to a terminal which is in a DRX short cycle mode. The DCP including the first indication is used to indicate the terminal to switch from the DRX short cycle mode to a DRX long cycle mode. Receiving of the DCP including the first indication by the terminal corresponds to that a WUS corresponding to the DCP is not considered to be detected by the terminal.

Step 121, a function configuration of the DCP that includes a fifth indication is sent; wherein the fifth indication is used to indicate that the DCP including the first indication is used to control switching from the DRX short cycle mode to the DRX long cycle mode.

FIG. 12

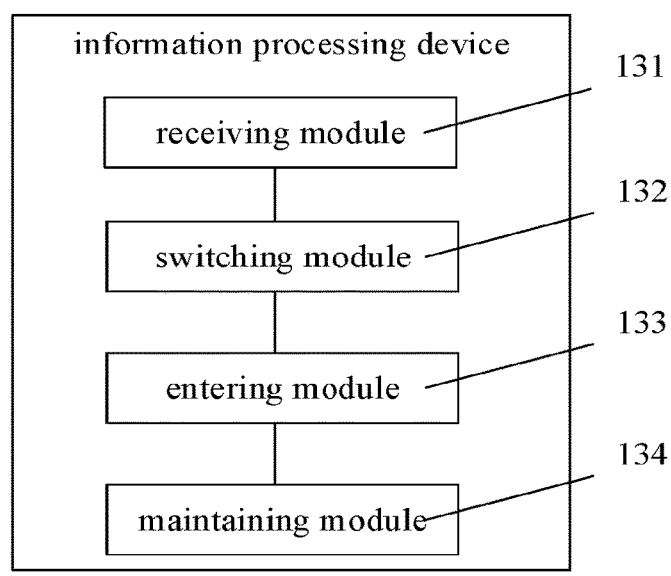

FIG. 13

INFORMATION PROCESSING METHOD AND APPARATUS BASED ON DCP IN DRX SHORT CYCLE MODE, AND COMMUNICATION DEVICE AND STORAGE MEDIUM

CROSS-REFERENCE TO RELATED APPLICATION

The present application is the U.S. National Stage of International Application No. PCT/CN2020/108713, filed on Aug. 12, 2020, the contents of all of which are incorporated herein by reference in their entireties for all purposes.

BACKGROUND OF THE INVENTION

Field of the Invention

The present disclosure generally relates to but is not limited to the wireless communication technical field, and more particularly, to an information processing method and device, a communication device and a storage medium.

Description of the Related Art

In wireless network communication, there are often multiple slots without data transmission on the Physical Downlink Control Channel (PDCCH) between two consecutive scheduling of downlink data. If a terminal continuously monitors the PDCCH during the time periods corresponding to the multiple slots, this will result in serious waste of terminal power consumption. Therefore, a Discontinuous Reception (DRX) mechanism is introduced for this situation. The PDCCH is periodically monitored based on the DRX mechanism to achieve power saving. In this way, the monitoring time of the terminal and the power consumption of the terminal can be reduced. However, the current DRX mechanism still has the problem of too frequent monitoring of Downlink Control Information (DCI) for power saving (DCP) and large power consumption.

SUMMARY OF THE INVENTION

Embodiments of the present disclosure provide an information processing method and device, a communication device and a storage medium.

According to a first aspect of embodiments of the present disclosure, there is provided an information processing method. The method is applied to a terminal and the method includes receiving, in a Discontinuous Reception (DRX) short cycle mode, Downlink Control Information (DCI) for power saving (DCP), and switching from the DRX short cycle mode to a DRX long cycle mode in response to that the DCP includes a first indication, wherein receiving of the DCP including the first indication by the terminal corresponds to that a wake up signal (WUS) corresponding to the DCP is not considered to be detected by the terminal.

According to a second aspect of embodiments of the present disclosure, there is provided an information processing method. The method is applied to a base station, and the method includes sending Downlink Control Information (DCI) for power saving (DCP) to a terminal which is in a Discontinuous Reception (DRX) short cycle mode, where the DCP including a first indication is used to indicate the terminal to switch from the DRX short cycle mode to a DRX long cycle mode, and receiving of the DCP including the first indication by the terminal corresponds to that a wake up signal (WUS) corresponding to the DCP is not considered to be detected by the terminal.

According to a third aspect of embodiments of the present disclosure, there is provided an information processing device. The device is applied to a terminal, and the device includes a receiving module configured to receive, in a Discontinuous Reception (DRX) short cycle mode, Downlink Control Information (DCI) for power saving (DCP), and a switching module configured to switch from the DRX short cycle mode to a DRX long cycle mode in response to that the DCP includes a first indication, wherein receiving of the DCP including the first indication by the terminal corresponds to that a wake up signal (WUS) corresponding to the DCP is not considered to be detected by the terminal.

According to a fourth aspect of embodiments of the present disclosure, there is provided an information processing device. The device is applied to a base station, and the device includes a sending module configured to send Downlink Control Information (DCI) for power saving (DCP) to a terminal which is in a Discontinuous Reception (DRX) short cycle mode, where the DCP including a first indication is used to indicate the terminal to switch from the DRX short cycle mode to a DRX long cycle mode, and receiving of the DCP including the first indication by the terminal corresponds to that a wake up signal (WUS) corresponding to the DCP is not considered to be detected by the terminal.

According to a fifth aspect of embodiments of the present disclosure, there is provided a communication device, including a processor and a memory storing instructions executable by the processor. The processor is configured to, when running the executable instructions, implement the method according to any one of the embodiments of the present disclosure.

According to a sixth aspect of embodiments of the present disclosure, there is provided a non-transitory computer storage medium having a computer-executable program stored thereon, wherein when the computer-executable program is executed by a processor, the processor is caused to perform the method according to any one of embodiments of the present disclosure.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 3 is a schematic diagram of a DRX cycle according to an example embodiment.

FIG. 4 is a flowchart of an information processing method according to an example embodiment.

FIG. 12 is a flowchart of an information processing method according to an example embodiment.

FIG. 13 is a schematic diagram of an information processing device according to an example embodiment.

DETAILED DESCRIPTION OF THE PREFERRED EMBODIMENTS

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of devices and methods consistent with aspects related to the present disclosure as recited in the appended claims.

The terms used in embodiments of the present disclosure are intended to describe exemplary embodiments only, and are not intended to limit embodiments of the present disclosure. The singular forms of "a" and "the" as used in the embodiments of the present disclosure and the appended claims are also intended to include plural forms unless the context clearly indicates otherwise. It should also be understood that the term "and/or" as used herein refers to and encompasses any or all possible combinations of one or more of associated listed items.

It should be understood that while terms first, second, third, etc. may be used to describe various information in embodiments of the present disclosure, such information should not be limited to these terms. These terms are used only to distinguish the same type of information from one another. For example, without departing from the scope of embodiments of the present disclosure, first information may also be referred to as second information, and similarly, second information may also be referred to as first information. Depending on the context, for example, the word "if" as used herein may be interpreted as "at the time of" or "when . . . " or "in response to a determination of . . . ".

For the sake of brevity and ease of understanding, the terms "greater than" or "less than" are used herein to represent size/magnitude relationships. However, for those skilled in the art, it is understood that the term "greater than" may also cover the meaning of "greater than or equal to" and "less than" may also cover the meaning of "less than or equal to", depending corresponding technical scenarios and technical solutions.

Figure 1:
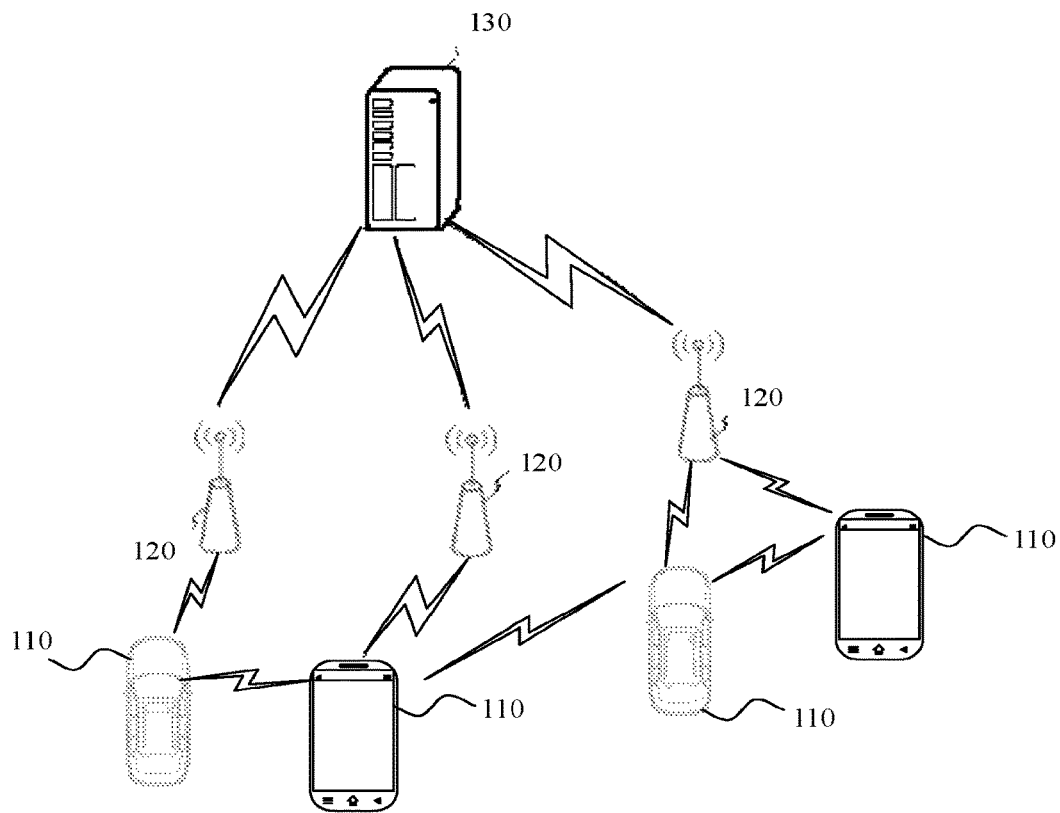
FIG. 1 is a schematic diagram of a structure of a wireless communication system.

FIG. 1 illustrates a schematic diagram of a structure of a wireless communication system according to an embodiment of the present disclosure. As shown in FIG. 1, the wireless communication system is a communication system based on cellular mobile communication technologies, and the wireless communication system may include: a plurality of user equipment 110 and a plurality of base stations 120.

The user equipment 110 may be devices that provide voice and/or data connectivity to users. The user equipment 110 may communicate with one or more core networks via a Radio Access Network (RAN). The user equipment 110 may be Internet of Things (IoT) user devices, such as sensor devices, cell phones (or called "cellular" phones), and computers with IoT user devices, for example, may be fixed, portable, pocket-sized, handheld, computer-built, or in-vehicle devices. For example, a station (STA), a subscriber unit, a subscriber station, a mobile station, a mobile, a remote station, an access point, a remote terminal, an access terminal, a user terminal, a user agent, a user device, or user equipment may be included. Alternatively, user equipment 110 may be an unmanned aerial vehicle device. Alternatively, user device 110 may be an in-vehicle device, for example, a trip computer with wireless communication capabilities, or a wireless user device with an external trip computer. Alternatively, the user equipment 110 may be a roadside device, for example, a street light, a signal light, or other roadside device with wireless communication capabilities, etc.

The base station 120 may be a network-side device in a wireless communication system. The wireless communication system may be the 4th generation mobile communication (4G) system, also known as Long Term Evolution (LTE) system; or, the wireless communication system may be a 5G system, also known as a new radio system or 5G NR system. Alternatively, the wireless communication system may be a next-generation system of a 5G system. The access network in the 5G system may be referred to as New Generation-Radio Access Network (NG-RAN).

The base station 120 may be an evolved base station (eNB) used in the 4G system. Alternatively, the base station 120 may be a base station (gNB) with a centralized distributed architecture used in a 5G system. When the base station 120 adopts the centralized distributed architecture, it usually includes a central unit (CU) and at least two distributed units (DUs). The central unit is provided with a protocol stack of a Packet Data Convergence Protocol (PDCP) layer, a Radio Link Control (RLC) layer, and Media Access Control (MAC) layer; the distributed units are provided with a physical (PHY) layer protocol stack, and the specific implementation of the base station 120 is not limited in the present disclosure.

A wireless connection may be established between the base station 120 and the user equipment 110 through a radio air interface. In different implementations, the radio air interface is a radio air interface based on the fourth generation mobile communication network technology (4G) standard; or, the radio air interface is a radio air interface based on the fifth generation mobile communication network technology (5G) standard, for example, the radio air interface is a new air interface; or, the radio air interface may also be a radio air interface based on a further next generation mobile communication network technology standard of 5G.

In some embodiments, an End to End (E2E) connection may also be established between user equipment 110. Examples include vehicle to vehicle (V2V) communication, vehicle to infrastructure (V2I) communication, vehicle to pedestrian (V2P) communication in vehicle to everything (V2X) communications.

Here, the above user equipment may be considered as a terminal device in the following embodiments.

In some embodiments, the above wireless communication system may further include a network management device 130.

A plurality of base stations 120 are connected to the network management device 130. The network management device 130 may be a core network device in the wireless communication system. For example, the network management device 130 may be a Mobility Management Entity (MME) in an Evolved Packet Core (EPC) network. Alternatively, the network management device may be other core network device, such as a Serving GateWay (SGW), Public Data Network GateWay (PGW), Policy and Charging Rules Function (PCRF), or Home Subscriber Server (HSS), etc. Embodiments of the present disclosure do not impose limitations on the form of implementation of the network management device 130.

In order to facilitate the understanding of any embodiment of the present disclosure, the DRX mechanism of the terminal will be explained first.

Figure 2:
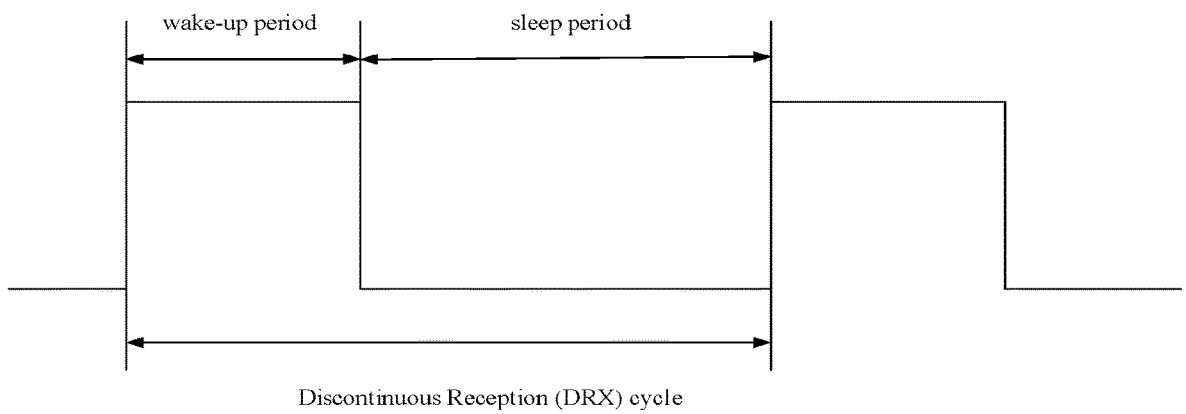
FIG. 2 is a schematic diagram of a DRX cycle according to an example embodiment.

Referring to FIG. 2, a DRX cycle includes a wake-up period and a sleep period. A Wake-up signal (WUS) is introduced in the Radio Resource Control (RRC) connected state. The WUS may indicate whether a terminal needs to monitor the PDCCH before the wake-up period of each DRX cycle arrives. If no downlink data is sent, the WUS indicates the terminal to sleep for the next DRX cycle; otherwise, the terminal continues to monitor the PDCCH in the wake-up period of the next DRX cycle.

The WUS indicates the monitoring of the PDCCH through Downlink Control Information (DCI) format 2_6 before the start of the wake-up period of each DRX cycle. The physical layer sends DCP carrying "1" to indicate the MAC layer that WUS is considered to be detected and wake-up is needed for next activation period. The physical layer sends DCP carrying "0" to indicate the MAC layer that WUS is not considered to be detected and sleep is needed for next wake-up period.

DRX is divided into two modes: DRX long cycle mode and DRX short cycle mode. According to protocols, the WUS only acts on the DRX long cycle, and before the start of the wake-up period (on duration) of each DRX long cycle, the detection of WUS is performed through the DCP to indicate the monitoring of the PDCCH. When a "positive" indication (an indication bit with a value of "1") of the DCP is received from the physical layer, the wake-up period (on duration) of the DRX long cycle is turned on; and when a "negative" indication (an indication bit with a value of "0") is received, the wake-up period (on duration) of the DRX long cycle is not turned on, so as to achieve the purpose of power saving. If the WUS is introduced to the DRX short cycle, the DRX short cycle has more intensive activation state and larger monitoring duration proportion than the DRX long cycle, and thus the frequent DRX short cycle will make the monitoring of the DCP too frequently and increase signaling overhead.

As shown in FIG. 3, if the WUS of DRX short cycle is configured in accordance with the DRX long cycle mode, when there is no data transmission, monitoring of DCP is required in each wake-up period (on duration) of DRX short cycle (corresponding to the dashed and solid line arrow in FIG. 3), which results in increase of signaling overhead. Therefore, it is needed to reduce the signaling overhead of the WUS for the DRX short cycle. Here, an activity timer is used to perform timekeeping for the time to maintain wake-up after each wake-up of the terminal. An inactivity timer (IAT) is started when data is received. A DRX short cycle timer is started or restarted when timing of IAT ends.

In an embodiment, in the timing range of the DRX short cycle timer, the terminal is in the DRX short cycle mode. Outside the timing range of the DRX short cycle timer, the terminal is in the DRX long cycle mode.

As shown in FIG. 4, an information processing method is provided in an embodiment. The method is applied to a terminal, and the method includes the following steps.

In step 401, DCP is received in a DRX short cycle mode.

In step 402, the terminal switches from the DRX short cycle mode to a DRX long cycle mode in response to that the DCP includes a first indication. Receiving of the DCP including the first indication by the terminal corresponds to that a wake up signal (WUS) corresponding to the DCP is not considered to be detected by the terminal.

In an embodiment, the terminal may be, but is not limited to, a cell phone, a wearable device, a vehicle terminal, a Road Side Unit (RSU), a smart home terminal, an industrial sensing device, and/or a medical device, etc.

In an embodiment, a base station sends the DCP. The base station is an interface device for the terminal to access the network. The base station may be a base station of various types, for example, a base station in the third generation mobile communication (3G) network, a base station in the fourth generation mobile communication (4G) network, a base station in the fifth generation mobile communication (5G) network, or other evolved base station.

In an embodiment, the DRX short cycle includes a wake-up period and a sleep period. During the wake-up period, the terminal is in a wake-up state; during the sleep period, the terminal is in a sleep state. Here, the DRX short cycle mode is a mode in which the terminal operates in the DRX short cycle.

In an embodiment, the wake-up state may be a state in which the terminal is capable of sending and receiving data. The sleep state may be a state in which the terminal does not perform data sending and receiving. Here, in the wake-up state, the antenna and/or transceiver of the terminal is in an on state and is capable of receiving uplink and downlink data. In the sleep state, the antenna and/or transceiver of the terminal is in the off state and is not capable of receiving uplink and downlink data. Here, the power consumption of the terminal in the wake-up state is higher than that of the terminal in the sleep state.

If the terminal receives the DCP containing a first indication, it indicates that a WUS is not considered to be detected by the terminal, or in other word, the WUS is not considered to be monitored by the terminal. If the terminal receives the DCP containing a second indication, it indicates that a WUS is considered to be detected by the terminal, or in other word, the WUS is considered to be monitored by the terminal.

In an embodiment, it is possible that the terminal switches from the DRX short cycle mode to the DRX long cycle mode in response to one received DCP. In this way, power consumption may be reduced.

In an embodiment, it is possible that the terminal switches from the DRX short cycle mode to the DRX long cycle mode in response to N consecutively received DCPs. Here, N is a positive integer greater than 1. This embodiment can reduce the output transmission delay caused by switching from the DRX short cycle mode to the DRX long cycle mode just because there is no data transmission at the current moment.

In an embodiment, conditions for the terminal to switch from the DRX long cycle to the DRX short cycle mode may include one of the following: expiration of the IAT; and receipt of a command to stop the IAT.

In an embodiment, the command to stop the IAT may be a media access control (MAC) control element (CE). Here, the IAT may be started or restarted when the terminal receives data sent from the base station. Here, the timing duration of the IAT may be set to a fixed value.

In an embodiment, the fixed value is greater than a first value when the amount of data to be transmitted is greater than a data amount threshold and/or the frequency of the transmitted data is greater than a frequency threshold; the fixed value is less than a second value when the amount of data to be transmitted is less than the data amount threshold and/or the frequency of the transmitted data is less than the frequency threshold. Here, the first value is greater than the second value. In this way, the timing duration of the IAT may be flexibly adapted to the amount of data to be transmitted and/or the frequency of the transmitted data, and the power consumption of the terminal is reduced while ensuring that the data to be transmitted can be transmitted in a timely manner.

In an embodiment, the terminal is in the DRX long cycle mode, and when the IAT expires, the terminal switches from the DRX long cycle mode to the DRX short cycle mode. Here, the discontinuous reception short cycle in the DRX short cycle mode has a more dense distribution of wake-up periods, a larger monitoring duration proportion, and a higher monitoring frequency of DCP than the discontinuous reception short cycle in the DRX long cycle mode. For example, in the DRX short cycle mode, there are a wake-up periods per unit time; in the DRX long cycle mode, there are b wake-up periods per unit time; where a>b. In the DRX short cycle mode, the monitoring duration proportion per unit time is c; in the DRX long cycle mode, the monitoring duration proportion per unit time is d; where c>d. In the DRX short cycle mode, the monitoring frequency of the DCP is e; in the DRX long cycle mode, the monitoring frequency of the DCP is f; where e>f. Therefore, the terminal operating in the DRX long cycle mode has lower power consumption compared to operating in the DRX short cycle mode.

In an embodiment, a WUS being not considered to be detected by the terminal may be that the DCP received by the terminal carries the first indication. For example, the DCP received by the terminal carries the first indication "0".

In an embodiment, a WUS being considered to be detected by the terminal may be that the DCP received by the terminal carries the second indication. For example, the DCP received by the terminal carries the second indication "1".

In an embodiment, the terminal receiving the DCP may be that the MAC layer receives the DCP from the PHY layer.

In an embodiment, the base station may send a WUS to the terminal prior to the activation period of the DRX short cycle. The WUS is used to indicate whether the terminal needs to perform PDCCH monitoring.

In an embodiment, in response to no data to be transmitted at the base station, the base station sends to the terminal a DCP carrying the first indication; or, in response to that there is data to be transmitted, the base station sends to the terminal a DCP carrying the second indication.

In an embodiment, in the DRX short cycle mode, according to data transmission requirements of the base station, the base station sends a DCP at monitoring time corresponding to each DRX short cycle of the terminal. If the DCP carries the first indication, the base station does not send a WUS, and the WUS is not considered to be detected by the terminal. If the DCP carries the second indication, the base station sends a WUS, and the WUS is considered to be detected by the terminal.

For example, in the DRX short cycle mode, when the base station has data to be sent to the terminal, the base station sends a DCP at the monitoring time corresponding to the DRX short cycle of the terminal, and the DCP carries an identifier of "1". In this way, the WUS is considered to be detected by the terminal. In the DRX short cycle mode, when the base station has no data to be sent to the terminal, the base station sends a DCP at the monitoring time corresponding to the DRX short cycle of the terminal, and the DCP carries an identifier of "0". In this way, the WUS is not considered to be detected by the terminal.

In an embodiment, in the DRX short cycle mode, the terminal enters a wake-up period in response to that a WUS is considered to be detected. Here, the terminal can receive the data sent by the base station during the wake-up period.

In an embodiment, in the DRX short cycle mode, the terminal switches from the DRX short cycle mode to the DRX long cycle mode in response to no WUS being considered to be detected. Here, the discontinuous reception short cycle in the DRX short cycle mode has a more dense distribution of wake-up periods, a larger monitoring duration proportion, and a higher monitoring frequency of DCP than the discontinuous reception short cycle in the DRX long cycle mode. For example, in the DRX short cycle mode, there are a wake-up periods per unit time; in the DRX long cycle mode, there are b wake-up periods per unit time; where a>b. In the DRX short cycle mode, the monitoring duration proportion per unit time is c; in the DRX long cycle mode, the monitoring duration proportion per unit time is d; where c>d. In the DRX short cycle mode, the monitoring frequency of the DCP is e; in the DRX long cycle mode, the monitoring frequency of the DCP is f; where e>f.

In an embodiment, switching from the DRX short cycle mode to the DRX long cycle mode may be stopping the timing of the DRX short cycle timer. Here, during the timing of the short cycle timer, the terminal is in the DRX short cycle mode. In an embodiment, the DRX short cycle timer is started at the end of timing of the inactivity timer. In an embodiment, the timing duration of the inactivity timer is greater than a third value when the amount of data to be transmitted is greater than a data amount threshold and/or the frequency of the transmitted data is greater than a frequency threshold; the timing duration of the inactivity timer is less than a fourth value when the amount of data to be transmitted is less than the data amount threshold and/or the frequency of the transmitted data is less than the frequency threshold. Here, the third value is greater than the fourth value. In this way, the timing duration of the DRX short cycle timer may be flexibly adapted to the amount of data to be transmitted and/or the frequency of the transmitted data, and the power consumption of the terminal is reduced while ensuring that the data to be transmitted can be transmitted in a timely manner.

In an embodiment, the terminal receives a function configuration of the DCP sent from the base station. In response to that the function configuration indicates that the DCP including the first indication is used to control switching from the DRX short cycle mode to the DRX long cycle mode, the terminal switches from the DRX short cycle mode to the DRX long cycle mode in response to the DCP including the first indication. In an embodiment, when the terminal does not receive the function configuration of the DCP sent by the base station or the function configuration of the DCP sent by the base station does not include the first indication, the terminal maintains the DRX short cycle mode. In an embodiment, the terminal sends an acquisition request to the base station to obtain the function configuration, and the base station, in response to receiving the acquisition request to obtain the function configuration from the terminal, sends the function configuration to the terminal in response to the acquisition request.

In an embodiment, in response to that the terminal detects that the power consumption of the terminal is greater than a power consumption threshold, the terminal sends the acquisition request for obtaining the function configuration to the base station. The base station, upon receiving the acquisition request, sends the function configuration to the terminal in response to the acquisition request. In this way, the terminal can switch from the DRX short cycle mode to the DRX long cycle mode in a timely manner in response to the DCP including the first indication, thereby reducing the monitoring frequency of the DCP, and reducing the power consumption of the terminal.

In an embodiment, in response to establishment of a Radio Resource Control (RRC) connection between the terminal and the base station, the base station sends the function configuration to the terminal. In this way, when data transmission is performed between the terminal and the base station, it is possible to switch from the DRX short cycle mode to the DRX long cycle mode in response to the DCP including the first indication, thereby reducing the monitoring frequency of the DCP, and reducing the power consumption of the terminal.

In embodiments of the present disclosure, in the DRX short cycle mode, when a WUS is not considered to be detected by the terminal, i.e., when there is no data transmission, the terminal can automatically switch from the DRX short cycle mode to the DRX long cycle mode based on the DCP including the first indication. As compared to the way in which the DRX short cycle mode is maintained when a WUS is not considered to be detected, the frequency for the terminal to monitor the DCP in the DRX long cycle mode is lower and the power consumption is smaller, and thus the number of times of monitoring of the DCP can be reduced when there is no data transmission, thereby reducing the power consumption of the terminal.

Figure 5:
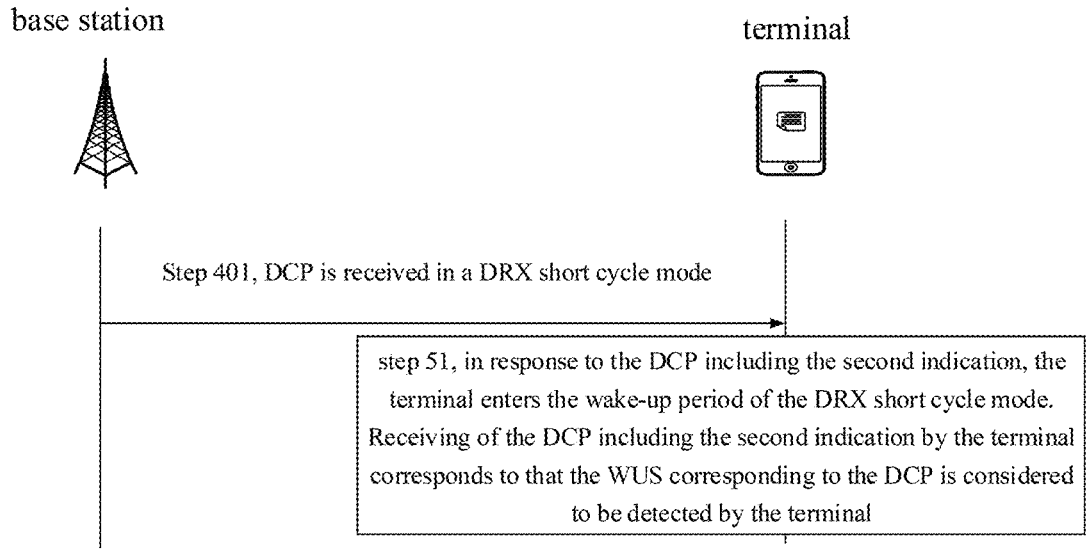
FIG. 5 is a flowchart of an information processing method according to an example embodiment.

As shown in FIG. 5, an information processing method is provided in an embodiment. The method further includes:

In step 51, in response to the DCP including the second indication, the terminal enters the wake-up period of the DRX short cycle mode. Receiving of the DCP including the second indication by the terminal corresponds to that the WUS corresponding to the DCP is considered to be detected by the terminal.

In an embodiment, the base station may send a WUS to the terminal prior to the activation period of the DRX short cycle. The WUS is used to indicate whether the terminal needs to perform PDCCH monitoring.

In an embodiment, in response to no data to be transmitted at the base station, the terminal receives the DCP carrying the first indication; or, in response to that there is data to be transmitted, the terminal receives the DCP carrying the second indication.

In an embodiment, a WUS being considered to be detected by the terminal may be that the terminal receives the DCP carrying the second indication. For example, the terminal receives the DCP carrying the second indication "1".

In an embodiment, a WUS not being considered to be detected by the terminal may be that the DCP received by the terminal carries the first indication. For example, the DCP received by the terminal carries the first indication "0".

In an embodiment, the terminal may start receiving data sent by the base station after entering the wake-up period of the DRX short cycle mode. Here, since the DCP carries the second indication, there is a demand for data transmission, and the terminal still maintains the DRX short cycle mode, and thus the data to be transmitted can be transmitted in time while saving the power consumption of the terminal.

Figure 6A:
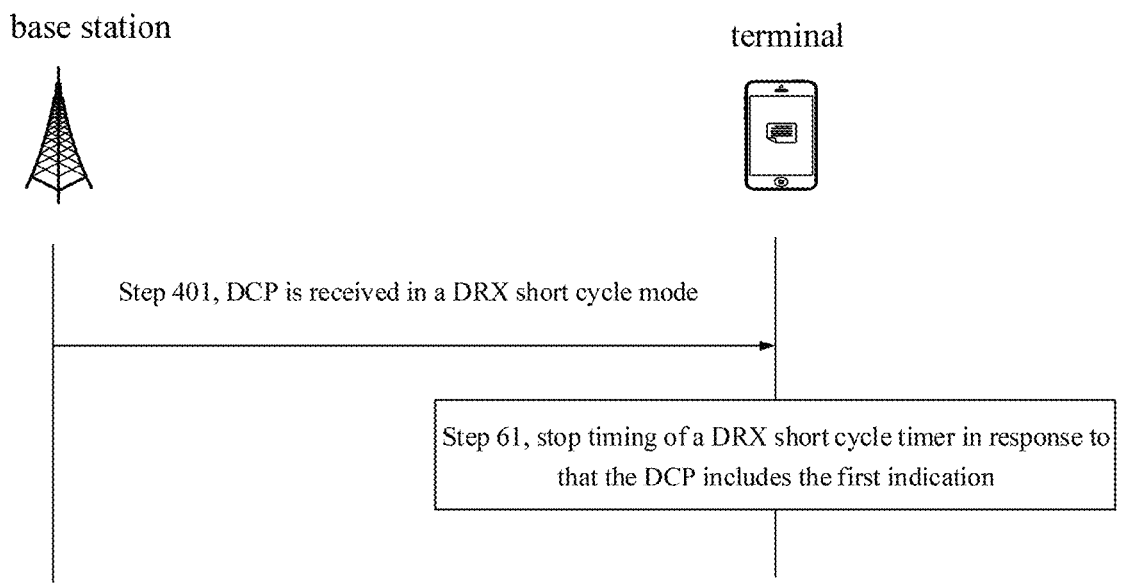
FIG. 6A is a flowchart of an information processing method according to an example embodiment.

As shown in FIG. 6A, an information processing method is provided in an embodiment. The switching from the DRX short cycle mode to the DRX long cycle mode in response to that the DCP includes the first indication in step 41 includes:

In step 61, stopping timing of a DRX short cycle timer in response to that the DCP includes the first indication.

Figure 6B:
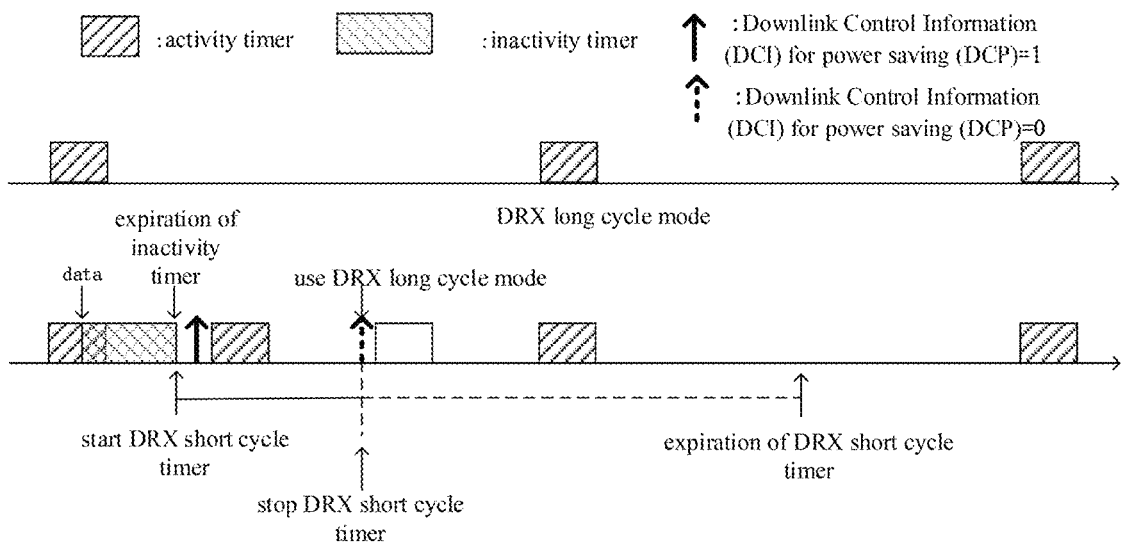
FIG. 6B is a schematic diagram of a DRX cycle according to an example embodiment.

In an embodiment, referring to FIG. 6B, the DRX short cycle timer is started when timing of the inactivity timer ends.

In an embodiment, the terminal is in the DRX short cycle mode in the timing range of the DRX short cycle timer. Outside the timing range of the DRX short cycle timer, the terminal is in the DRX long cycle mode.

Here, the timing duration of the DRX short cycle timer may be determined according to the power consumption requirements of the terminal. In an embodiment, if the terminal requires low power consumption, the timing duration of the DRX short cycle timer may be set small. For example, the power consumption of the terminal is required to be less than a1, the timing duration of the DRX short cycle timer may be set as less than b1. In another embodiment, if the terminal can have high power consumption, the timing duration of the DRX short cycle timer may be set large. For example, the power consumption of the terminal may be greater than a2, then the timing duration of the DRX short cycle timer may be set as larger than b2, where, a1<a2, and b1<b2. In this way, the timing duration of the DRX short cycle timer can be flexibly adjusted according to the requirements of the power consumption of the terminal to reduce the power consumption of the terminal while transmitting data in a timely manner.

Here, the timing duration of the DRX short cycle timer may be determined according to a data transmission latency requirement of the terminal. In an embodiment, if the terminal requires low latency, a large timing duration of the DRX short cycle timer may be set. For example, if the terminal's latency is required to be less than c1, the timing duration of the DRX short cycle timer may be set as larger than d1. In another embodiment, if the terminal can have a large latency, a small timing duration of the DRX short cycle timer may be set. For example, the time latency of the terminal may be greater than c2, then the timing duration of the DRX short cycle timer may be set as less than d2, where, c1<c2, d1>d2. In this way, the timing duration of the DRX short cycle timer can be flexibly adjusted according to the data transmission latency requirement of the terminal to reduce the power consumption of the terminal while transmitting data in a timely manner.

Here, the timing duration of the DRX short cycle timer may be determined according to the amount of data to be transmitted. In an embodiment, if the terminal needs to transmit a large amount of data each time, a large timing duration of the DRX short cycle timer may be set. For example, if the amount of data that the terminal needs to transmit each time is greater than e1, the timing duration of the DRX short cycle timer may be set as larger than f1. In another embodiment, if the terminal needs to transmit a small amount of data each time, a small timing duration of the DRX short cycle timer may be set. For example, if the amount of data to be transmitted by the terminal is less than e2, the timing duration of the DRX short cycle timer may be set as smaller than f2, where, e1>e2, f1>f2. In this way, the timing duration of the DRX short cycle timer can be flexibly adjusted according to the amount of data to be transmitted, so as to reduce the power consumption of the terminal while transmitting data in a timely manner.

Figure 7:
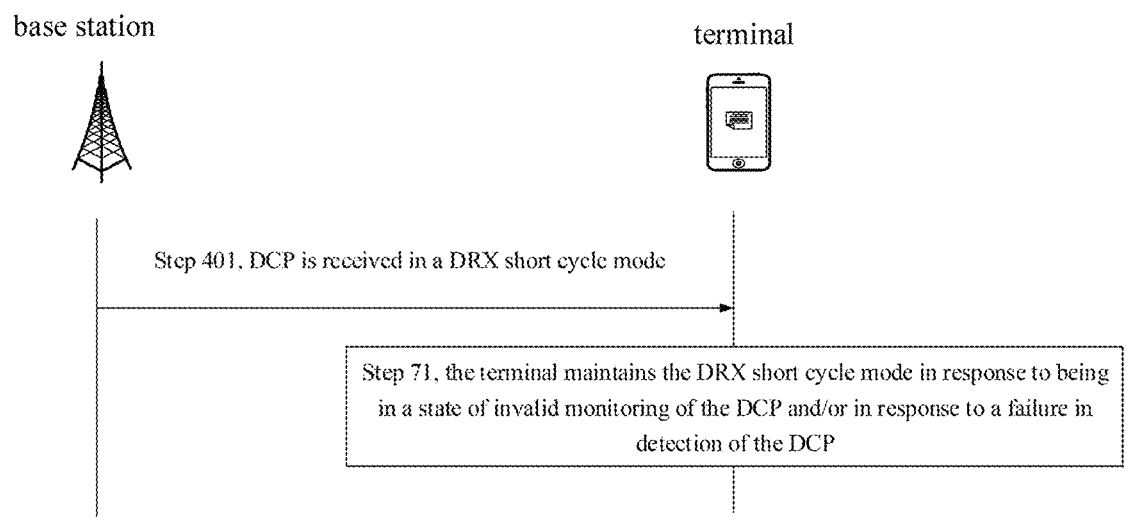
FIG. 7 is a flowchart of an information processing method according to an example embodiment.

As shown in FIG. 7, an information processing method is provided in an embodiment. The method further includes:

In step 71, the terminal maintains the DRX short cycle mode in response to being in a state of invalid monitoring of the DCP and/or in response to a failure in monitoring of the DCP; and the state of invalid monitoring is a state where the DCP cannot be monitored.

In an embodiment, when the terminal is in the state of invalid monitoring, the DCP cannot be detected by the terminal. Here, in response to the state of invalid monitoring of the DCP, the DRX short cycle mode is maintained to ensure that the terminal receives the data sent by the base station in a timely manner in a case where the terminal cannot obtain the DCP.

In an embodiment, the failure in monitoring of DCP may be resulted from a channel quality for wireless communication being less than a channel quality threshold.

In an embodiment, the state of invalid monitoring includes at least one of:
- being in a state where an inactivity timer (IAT) is timing;
- being in a state of Bandwidth Part (BWP) switching;
- being in a state of measurement gap; or
- being in a state where the terminal is performing random access.

In an embodiment, when the terminal is in the state of invalid monitoring, the terminal suspends monitoring of the DCP.

Figure 8:
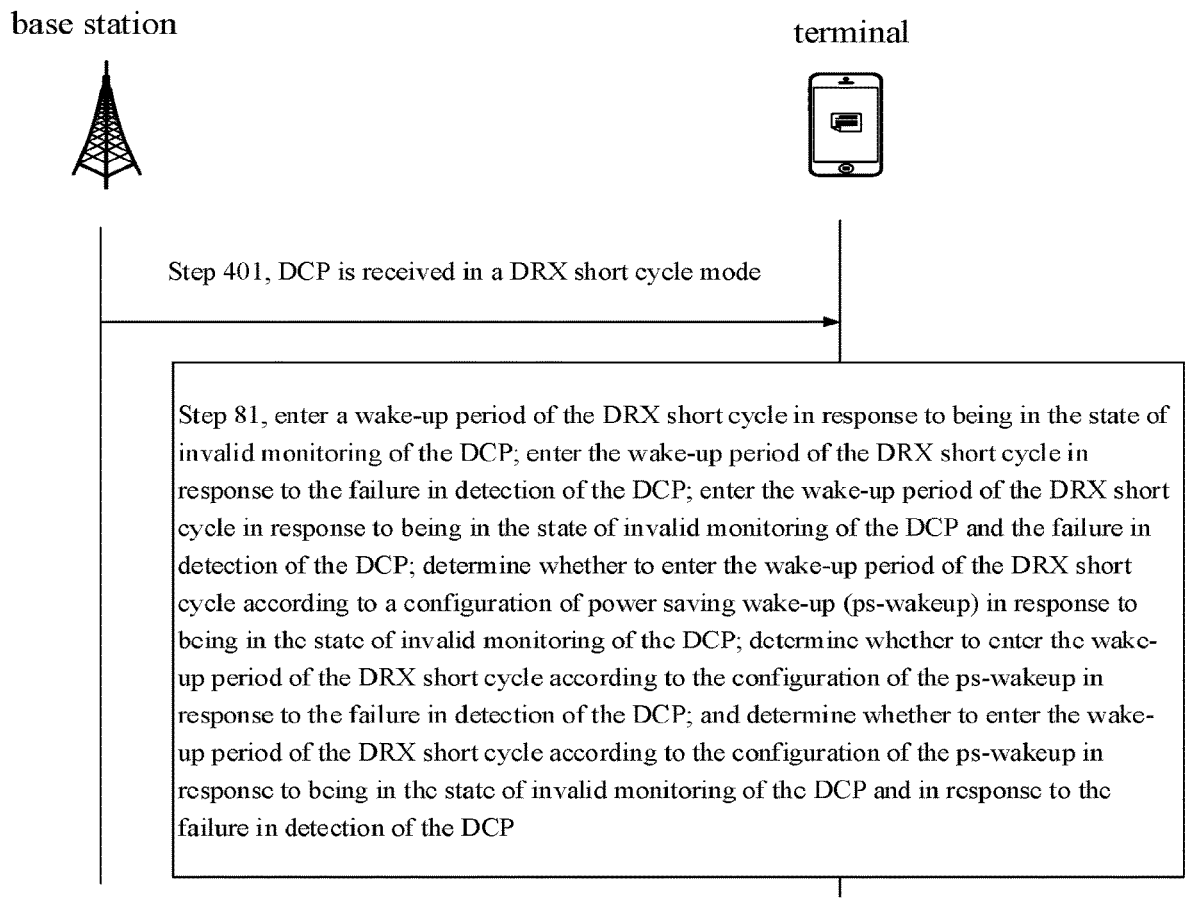
FIG. 8 is a flowchart of an information processing method according to an example embodiment.

As shown in FIG. 8, an information processing method is provided in an embodiment. The maintaining the DRX short cycle mode in response to being in the state of invalid monitoring of the DCP and/or in response to the failure in monitoring of the DCP in step 71 includes at least one of:
- in step 81, entering a wake-up period of the DRX short cycle in response to being in the state of invalid monitoring of the DCP;
- entering the wake-up period of the DRX short cycle in response to the failure in monitoring of the DCP;
- entering the wake-up period of the DRX short cycle in response to being in the state of invalid monitoring of the DCP and the failure in monitoring of the DCP;
- determining whether to enter the wake-up period of the DRX short cycle according to a configuration of power saving wake-up (ps-wakeup) in response to being in the state of invalid monitoring of the DCP;
- determining whether to enter the wake-up period of the DRX short cycle according to the configuration of the ps-wakeup in response to the failure in monitoring of the DCP; or
- determining whether to enter the wake-up period of the DRX short cycle according to the configuration of the ps-wakeup in response to being in the state of invalid monitoring of the DCP and in response to the failure in monitoring of the DCP.

In an embodiment, a DRX short cycle includes a wake-up period and a sleep period. In the wake-up period, the terminal is in the wake-up state; in the sleep period, the terminal is in the sleep state.

Figure 9:
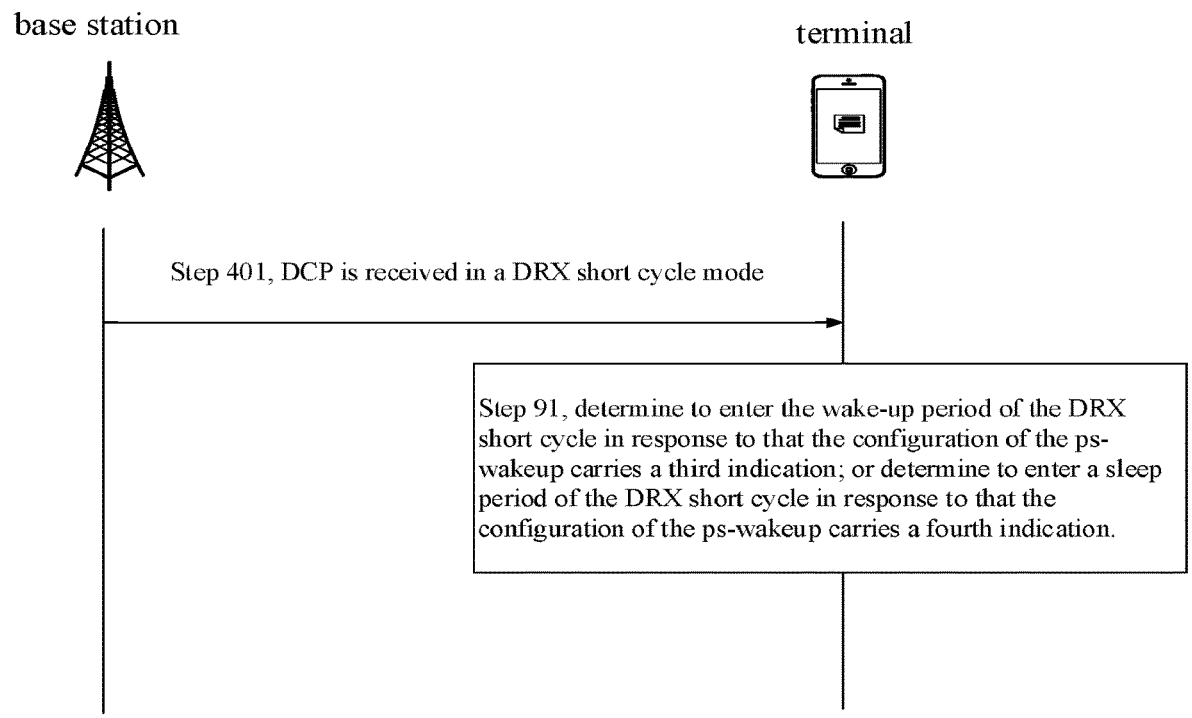
FIG. 9 is a flowchart of an information processing method according to an example embodiment.

As shown in FIG. 9, an information processing method is provided in an embodiment. The determining of whether to enter the wake-up period of the DRX short cycle according to the configuration of the ps-wakeup includes:
- in step 91, determining to enter the wake-up period of the DRX short cycle in response to that the configuration of the ps-wakeup carries a third indication; or
- determining to enter a sleep period of the DRX short cycle in response to that the configuration of the ps-wakeup carries a fourth indication.

Here, in response to that the terminal requires low power consumption, the configuration of the ps-wakeup can be set to carry the third indication. For example, if the power consumption of the terminal is required to be less than a, then the configuration of the ps-wakeup can be set to carry the third indication. In response to that the terminal may have high power consumption, the configuration of the ps-wakeup can be set to carry the fourth indication. For example, if the power consumption of the terminal may be greater than b, then the configuration of the ps-wakeup may be set to carry the fourth indication. In this way, whether to enter the wake-up period of the DRX short cycle may be determined according to the requirements of the power consumption of the terminal, thereby reducing the power consumption of the terminal.

Here, in response to that the terminal requires low latency, the configuration of the ps-wakeup may be set to carry the third indication. For example, if the terminal is required to have a latency less than c, the configuration of the ps-wakeup may be set to carry the third indication. In response to that the terminal may have large latency, the configuration of the ps-wakeup may be set to carry the fourth indication. For example, if the terminal can have a latency greater than d, the configuration of the ps-wakeup may be set to carry the fourth indication. In this way, whether to enter the wake-up period of the DRX short cycle may be determined according to the latency requirement of the terminal for data, thereby reducing the power consumption of the terminal while transmitting data in time.

Here, in response to large amount of data that the terminal needs to transmit each time, the configuration of the ps-wakeup may be set to carry the third indication. For example, if the data amount of the terminal is greater than e for each data transmission, the configuration of the ps-wakeup may be set to carry the third indication. In response to small amount of data that the terminal needs to transmit each time, the configuration of the ps-wakeup may be set to carry the fourth indication. For example, if the amount of data to be transmitted by the terminal is less than f, the configuration of the ps-wakeup may be set to carry the fourth indication. In this way, whether to enter the DRX short cycle wake-up period may be determined according to the amount of data to be transmitted, thereby reducing the power consumption of the terminal while transmitting data in a timely manner.

Figure 10:
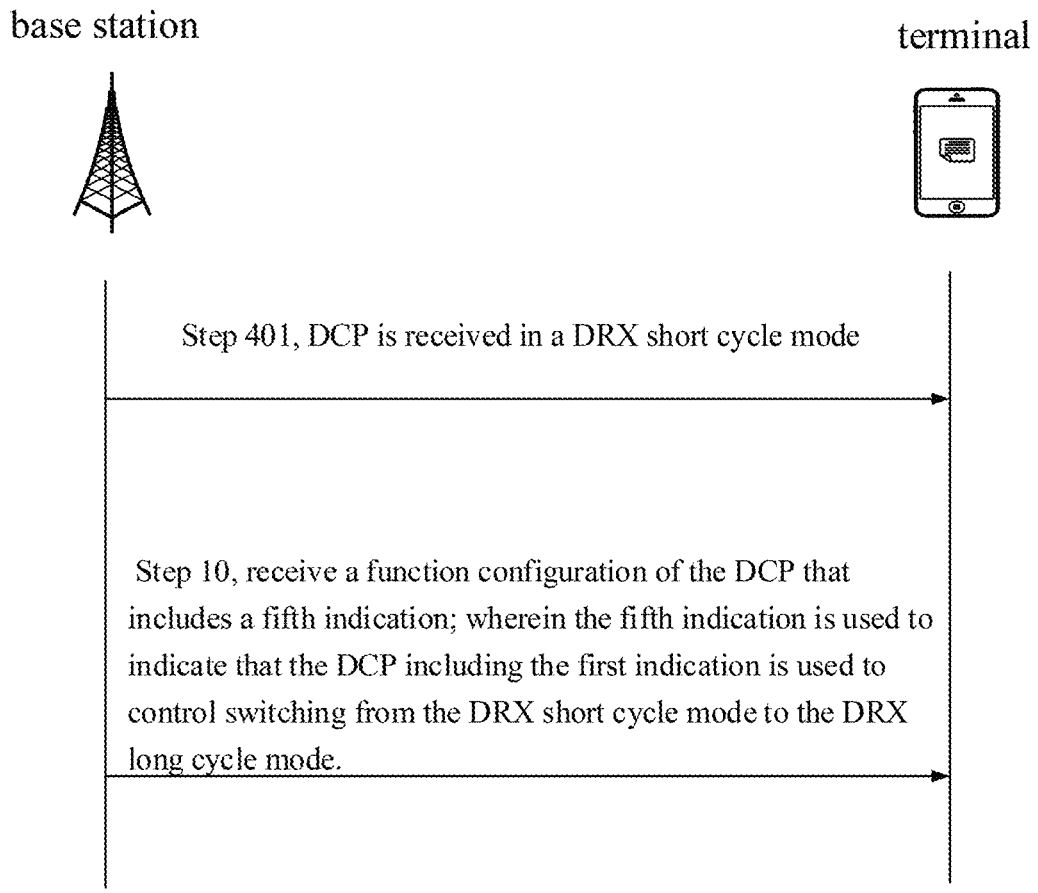
FIG. 10 is a flowchart of an information processing method according to an example embodiment.

As shown in FIG. 10, an information processing method is provided in an embodiment. The method further include:
- in step 10, receiving a function configuration of the DCP that includes a fifth indication where the fifth indication is used to indicate that the DCP including the first indication is used to control switching from the DRX short cycle mode to the DRX long cycle mode.

In an embodiment, the DCP carrying the first indication is sent to the terminal in response to no data to be transmitted at the base station.

In an embodiment, in the DRX short cycle mode, in response to that no WUS is considered to be detected, the terminal switches from the DRX short cycle mode to the DRX long cycle mode. Here, switching from the DRX short cycle mode to the DRX long cycle mode may being stopping the timing of the short cycle timer. Here, during the timing of the short cycle timer, the terminal is in the DRX short cycle mode.

Figure 11:
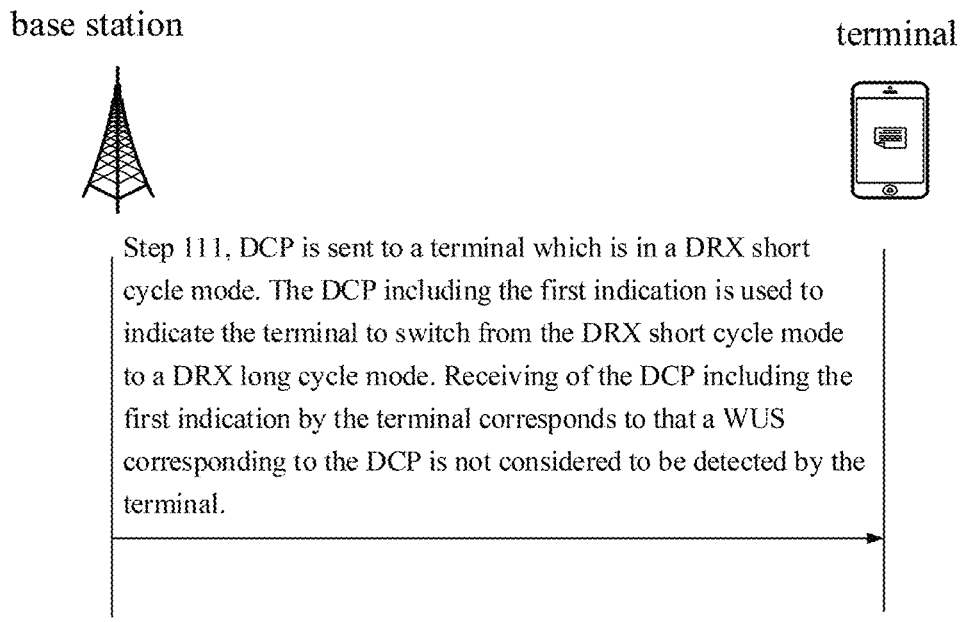
FIG. 11 is a flowchart of an information processing method according to an example embodiment.

As shown in FIG. 11, an information processing method is provided in an embodiment. The method is applied to a base station, and the method includes the following steps.

In step 111, DCP is sent to a terminal which is in a DRX short cycle mode. The DCP including the first indication is used to indicate the terminal to switch from the DRX short cycle mode to a DRX long cycle mode. Receiving of the DCP including the first indication by the terminal corresponds to that a WUS corresponding to the DCP is not considered to be detected by the terminal.

In an embodiment, the terminal may be, but is not limited to, a cell phone, a wearable device, a vehicle terminal, a Road Side Unit (RSU), a smart home terminal, an industrial sensing device, and/or a medical device, etc.

In an embodiment, the base station is an interface device for the terminal to access the network. The base station may be a base station of various types, for example, a base station in the third generation mobile communication (3G) network, a base station in the fourth generation mobile communication (4G) network, a base station in the fifth generation mobile communication (5G) network, or other evolved base station.

In an embodiment, the DRX short cycle includes a wake-up period and a sleep period. During the wake-up period, the terminal is in a wake-up state; during the sleep period, the terminal is in a sleep state. Here, the DRX short cycle mode is a mode in which the terminal operates in the DRX short cycle.

In an embodiment, the wake-up state may be a state in which the terminal is capable of sending and receiving data. The sleep state may be a state in which the terminal does not perform data sending and receiving. Here, in the wake-up state, the antenna and/or transceiver of the terminal is in an on state and is capable of receiving uplink and downlink data. In the sleep state, the antenna and/or transceiver of the terminal is in the off state and is not capable of receiving uplink and downlink data. Here, the power consumption of the terminal in the wake-up state is higher than that of the terminal in the sleep state.

If the terminal receives the DCP containing a first indication, it indicates that a WUS is not considered to be detected by the terminal, or in other word, the WUS is not considered to be monitored by the terminal. If the terminal receives the DCP containing a second indication, it indicates that a WUS is considered to be detected by the terminal, or in other word, the WUS is considered to be detected by the terminal.

In an embodiment, it is possible that the terminal switches from the DRX short cycle mode to the DRX long cycle mode in response to one received DCP. In this way, power consumption may be reduced.

In an embodiment, it is possible that the terminal switches from the DRX short cycle mode to the DRX long cycle mode in response to N consecutively received DCPs. Here, N is a positive integer greater than 1. This embodiment can reduce the output transmission delay caused by switching from the DRX short cycle mode to the DRX long cycle mode just because there is no data transmission at the current moment.

In an embodiment, conditions for the terminal to switch from the DRX long cycle to the DRX short cycle mode may include one of the following: expiration of the IAT; and receipt of a command to stop the IAT.

In an embodiment, the command to stop the IAT may be a media access control (MAC) control element (CE). Here, the IAT may be started or restarted when the terminal receives data sent from the base station. Here, the timing duration of the IAT may be set to a fixed value.

In an embodiment, the fixed value is greater than a first value when the amount of data to be transmitted is greater than a data amount threshold and/or the frequency of the transmitted data is greater than a frequency threshold; the fixed value is less than a second value when the amount of data to be transmitted is less than the data amount threshold and/or the frequency of the transmitted data is less than the frequency threshold. Here, the first value is greater than the second value. In this way, the timing duration of the IAT may be flexibly adapted to the amount of data to be transmitted and/or the frequency of the transmitted data, and the power consumption of the terminal is reduced while ensuring that the data to be transmitted can be transmitted in a timely manner.

In an embodiment, the terminal is in the DRX long cycle mode, and when the IAT expires, the terminal switches from the DRX long cycle mode to the DRX short cycle mode. Here, the discontinuous reception short cycle in the DRX short cycle mode has a more dense distribution of wake-up periods, a larger monitoring duration proportion, and a higher monitoring frequency of DCP than the discontinuous reception short cycle in the DRX long cycle mode. For example, in the DRX short cycle mode, there are a wake-up periods per unit time; in the DRX long cycle mode, there are b wake-up periods per unit time; where a>b. In the DRX short cycle mode, the monitoring duration proportion per unit time is c; in the DRX long cycle mode, the monitoring duration proportion per unit time is d; where c>d. In the DRX short cycle mode, the monitoring frequency of the DCP is e; in the DRX long cycle mode, the monitoring frequency of the DCP is f; where e>f.

In an embodiment, a WUS not being considered to be detected by the terminal may be that the DCP received by the terminal carries the first indication. For example, the DCP received by the terminal carries the first indication "0".

In an embodiment, a WUS being considered to be detected by the terminal may be that the DCP received by the terminal carries the second indication. For example, the DCP received by the terminal carries the second indication "1".

In an embodiment, the terminal receiving the DCP may be that the MAC layer receives the DCP from the PHY layer.

In an embodiment, the base station may send a WUS to the terminal prior to the activation period of the DRX short cycle. The WUS is used to indicate whether the terminal needs to perform PDCCH monitoring.

In an embodiment, in response to no data to be transmitted at the base station, the base station sends to the terminal a DCP carrying the first indication; or, in response to that there is data to be transmitted, the base station sends to the terminal a DCP carrying the second indication.

In an embodiment, in the DRX short cycle mode, according to data transmission requirements of the base station, the base station sends a DCP at monitoring time corresponding to each DRX short cycle of the terminal. If the DCP carries the first indication, the base station does not send a WUS, and the WUS is not considered to be detected by the terminal. If the DCP carries the second indication, the base station sends a WUS, and the WUS is considered to be detected by the terminal.

For example, in the DRX short cycle mode, when the base station has data to be sent to the terminal, the base station sends a DCP at the monitoring time corresponding to the DRX short cycle of the terminal, and the DCP carries an identifier of "1". In this way, the WUS can be considered to be detected by the terminal. In the DRX short cycle mode, when the base station has no data to be sent to the terminal, the base station sends a DCP at the monitoring time corresponding to the DRX short cycle of the terminal, and the DCP carries an identifier of "0". In this way, the WUS cannot be considered to be detected by the terminal.

In an embodiment, in the DRX short cycle mode, the terminal enters a wake-up period in response to that a WUS is considered to be detected. Here, the terminal can receive the data sent by the base station during the wake-up period.

In an embodiment, in the DRX short cycle mode, the terminal switches from the DRX short cycle mode to the DRX long cycle mode in response to no WUS being considered to be detected. Here, the discontinuous reception short cycle in the DRX short cycle mode has a more dense distribution of wake-up periods, a larger monitoring duration proportion, and a higher monitoring frequency of DCP than the discontinuous reception short cycle in the DRX long cycle mode. For example, in the DRX short cycle mode, there are a wake-up periods per unit time; in the DRX long cycle mode, there are b wake-up periods per unit time; where a>b. In the DRX short cycle mode, the monitoring duration proportion per unit time is c; in the DRX long cycle mode, the monitoring duration proportion per unit time is d; where c>d. In the DRX short cycle mode, the monitoring frequency of the DCP is e; in the DRX long cycle mode, the monitoring frequency of the DCP is f; where e>f.

In an embodiment, switching from the DRX short cycle mode to the DRX long cycle mode may be stopping the timing of the DRX short cycle timer. Here, during the timing of the short cycle timer, the terminal is in the DRX short cycle mode. In an embodiment, the DRX short cycle timer is started at the end of timing of the inactivity timer. In an embodiment, the timing duration of the inactivity timer is greater than a third value when the amount of data to be transmitted is greater than a data amount threshold and/or the frequency of the transmitted data is greater than a frequency threshold; the timing duration of the inactivity timer is less than a fourth value when the amount of data to be transmitted is less than the data amount threshold and/or the frequency of the transmitted data is less than the frequency threshold. Here, the third value is greater than the fourth value. In this way, the timing duration of the DRX short cycle timer may be flexibly adapted to the amount of data to be transmitted and/or the frequency of the transmitted data, and the power consumption of the terminal is reduced while ensuring that the data to be transmitted can be transmitted in a timely manner.

In an embodiment, the terminal receives a function configuration of the DCP sent from the base station. In response to that the function configuration indicates that the DCP including the first indication is used to control switching from the DRX short cycle mode to the DRX long cycle mode, the terminal switches from the DRX short cycle mode to the DRX long cycle mode in response to the DCP including the first indication. In an embodiment, when the terminal does not receive the function configuration of the DCP sent by the base station or the function configuration of the DCP sent by the base station does not include the first indication, the terminal maintains the DRX short cycle mode. In an embodiment, the terminal sends an acquisition request to the base station to obtain the function configuration, and the base station, in response to receiving the acquisition request to obtain the function configuration from the terminal, sends the function configuration to the terminal in response to the acquisition request.

In an embodiment, in response to that the terminal detects that the power consumption of the terminal is greater than a power consumption threshold, the terminal sends the acquisition request for obtaining the function configuration to the base station. The base station, upon receiving the acquisition request, sends the function configuration to the terminal in response to the acquisition request. In this way, the terminal can switch from the DRX short cycle mode to the DRX long cycle mode in a timely manner in response to the DCP including the first indication, thereby reducing the monitoring frequency of the DCP, and reducing the power consumption of the terminal.

In an embodiment, in response to establishment of a Radio Resource Control (RRC) connection between the terminal and the base station, the base station sends the function configuration to the terminal. In this way, when data transmission is performed between the terminal and the base station, it is possible to switch from the DRX short cycle mode to the DRX long cycle mode in response to the DCP including the first indication, thereby reducing the monitoring frequency of the DCP, and reducing the power consumption of the terminal.

In embodiments of the present disclosure, in the DRX short cycle mode, when a WUS is not considered to be detected by the terminal, i.e., when there is no data transmission, the terminal can automatically switch from the DRX short cycle mode to the DRX long cycle mode based on the DCP including the first indication. As compared to the way in which the DRX short cycle mode is maintained when a WUS is not considered to be detected, the frequency for the terminal to monitor the DCP in the DRX long cycle mode is lower and the power consumption is smaller, and thus the number of times of monitoring of the DCP can be reduced when there is no data transmission, thereby reducing the power consumption of the terminal.

In an embodiment, the DCP including the second indication is used to indicate the terminal to enter the wake-up period of the DRX short cycle mode. Receiving of the DCP including the second indication by the terminal corresponds to that the WUS corresponding to the DCP is considered to be detected by the terminal.

In an embodiment, the base station may send a WUS to the terminal prior to the activation period of the DRX short cycle. The WUS is used to indicate whether the terminal needs to perform PDCCH monitoring.

In an embodiment, in response to that the base station has data to be transmitted, the base station sends to the terminal the DCP carrying the first indication; or, in response to that there is no data to be transmitted, the base station sends the DCP carrying the second indication.

In an embodiment, a WUS being considered to be detected by the terminal may be that the terminal receives the DCP carrying the second indication. For example, the terminal receives the DCP carrying the second indication "1".

In an embodiment, the terminal may start receiving data sent by the base station after entering the wake-up period of the DRX short cycle mode.

As shown in FIG. 12, an information processing method is provided in an embodiment. The method further includes:

in step 121, sending a function configuration of the DCP that includes a fifth indication, where the fifth indication is used to indicate that the DCP including the first indication is used to control switching from the DRX short cycle mode to the DRX long cycle mode.

In an embodiment, in response to that the base station has no data to be transmitted, the base station sends the DCP carrying the first indication.

In an embodiment, in the DRX short cycle mode, in response to no WUS being considered to be detected, the terminal switches from the DRX short cycle mode to the DRX long cycle mode. Here, switching from the DRX short cycle mode to the DRX long cycle mode may be stopping timing of the short cycle timer. Here, during timing of the short cycle timer, the terminal is in the DRX short cycle mode.

As shown in FIG. 13, an information processing device is provided in an embodiment of the present disclosure. The device is applied to a terminal. The device includes a receiving module 131 and a switching module 132.

The receiving module 131 is configured to receive, in a Discontinuous Reception (DRX) short cycle mode, Downlink Control Information (DCI) for power saving (DCP).

The switching module 132 is configured to switch from the DRX short cycle mode to a DRX long cycle mode in response to that the DCP includes a first indication, wherein receiving of the DCP including the first indication by the terminal corresponds to that a wake up signal (WUS) corresponding to the DCP is not considered to be detected by the terminal.

In an embodiment, the device further includes an entering module 133.

The entering module 133 is configured to enter a wake-up period of the DRX short cycle mode in response to that the DCP includes a second indication, wherein receiving of the DCP including the second indication by the terminal corresponds to that the WUS corresponding to the DCP is considered to be detected by the terminal.

In an embodiment, the switching module 132 is further configured to:

stop timing of a DRX short cycle timer in response to that the DCP includes the first indication.

In an embodiment, the device further includes a maintaining module 134. The maintaining module 134 is further configured to: maintain the DRX short cycle mode in response to being in a state of invalid monitoring of the DCP and/or in response to a failure in monitoring of the DCP, where the state of invalid monitoring is a state where monitoring of the DCP is not possible.

In an embodiment, the state of invalid monitoring includes at least one of:

being in a state where an inactivity timer (IAT) is timing;
being in a state of Bandwidth Part (BWP) switching;
being in a state of measurement gap; or
being in a state where the terminal is performing random access.

In an embodiment, maintaining the DRX short cycle mode in response to being in the state of invalid monitoring of the DCP and/or in response to the failure in monitoring of the DCP includes at least one of:

entering a wake-up period of the DRX short cycle in response to being in the state of invalid monitoring of the DCP;
entering the wake-up period of the DRX short cycle in response to the failure in monitoring of the DCP;
entering the wake-up period of the DRX short cycle in response to being in the state of invalid monitoring of the DCP and the failure in monitoring of the DCP;
determining whether to enter the wake-up period of the DRX short cycle according to a configuration of power saving wake-up (ps-wakeup) in response to being in the state of invalid monitoring of the DCP;
determining whether to enter the wake-up period of the DRX short cycle according to the configuration of the ps-wakeup in response to the failure in monitoring of the DCP; or
determining whether to enter the wake-up period of the DRX short cycle according to the configuration of the ps-wakeup in response to being in the state of invalid monitoring of the DCP and the failure in monitoring of the DCP.

In an embodiment, the maintaining module 134 is further configured to determine to enter the wake-up period of the DRX short cycle in response to that the configuration of the ps-wakeup carries a third indication, or determine to enter a sleep period of the DRX short cycle in response to that the configuration of the ps-wakeup carries a fourth indication.

In an embodiment, the receiving module 131 is configured to receive a function configuration of the DCP that includes a fifth indication, where the fifth indication is used to indicate that the DCP including the first indication is used to control switching from the DRX short cycle mode to the DRX long cycle mode.

Figure 14:
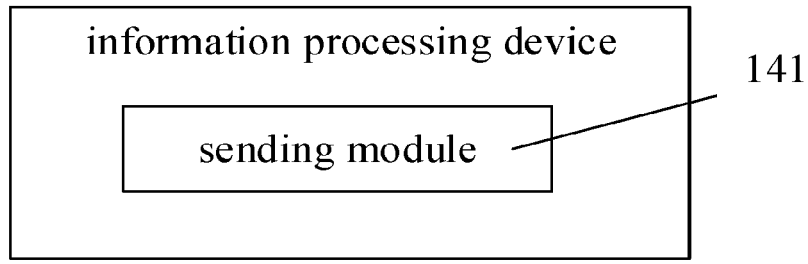
FIG. 14 is a schematic diagram of an information processing device according to an example embodiment.

As shown in FIG. 14, an information processing device is provided in an embodiment of the present disclosure. The device is applied to a base station. The device includes a sending module 141. The sending module 141 is configured to send Downlink Control Information (DCI) for power saving (DCP) to a terminal which is in a Discontinuous Reception (DRX) short cycle mode, where the DCP including a first indication is used to indicate the terminal to switch from the DRX short cycle mode to a DRX long cycle mode, and receiving of the DCP including the first indication by the terminal corresponds to that a wake up signal (WUS) corresponding to the DCP is not considered to be detected by the terminal.

In an embodiment, the DCP including a second indication is used to indicate entering of a wake-up period of the DRX short cycle mode, and receiving of the DCP including the second indication by the terminal corresponds to that the WUS corresponding to the DCP is considered to be detected by the terminal.

In an embodiment, the sending module 141 is further configured to send a function configuration of the DCP that includes a fifth indication, where the fifth indication is used to indicate that the DCP including the first indication is used to control switching from the DRX short cycle mode to the DRX long cycle mode.

Regarding the devices in the above embodiments, the specific way in which each module performs its operation has been described in detail in the embodiments concerning the methods, and details will not be repeated here.

An embodiment of the present disclosure provides a communication device, including a processor and a memory for storing instructions executable by the processor. The processor is configured to, when running the executable instructions, implement the method according to any one of the embodiments of the present disclosure.

The processor may include various types of storage medium that are non-transitory computer storage medium capable of continuing to store information thereon in memory after the communication device is powered down.

The processor may be connected to the memory via a bus or the like for reading the executable programs stored on the memory.

An embodiment of the present disclosure further provides a computer storage medium. The computer storage medium stores a computer executable program. When the executable program is executed by the processor, the processor is caused to implement the method according to any one of the embodiments of the present disclosure.

With respect to the devices of the above embodiments, the specific manner in which the individual modules perform their operations has been described in detail in the embodiments relating to the methods, and details will not be repeated here.

Figure 15:
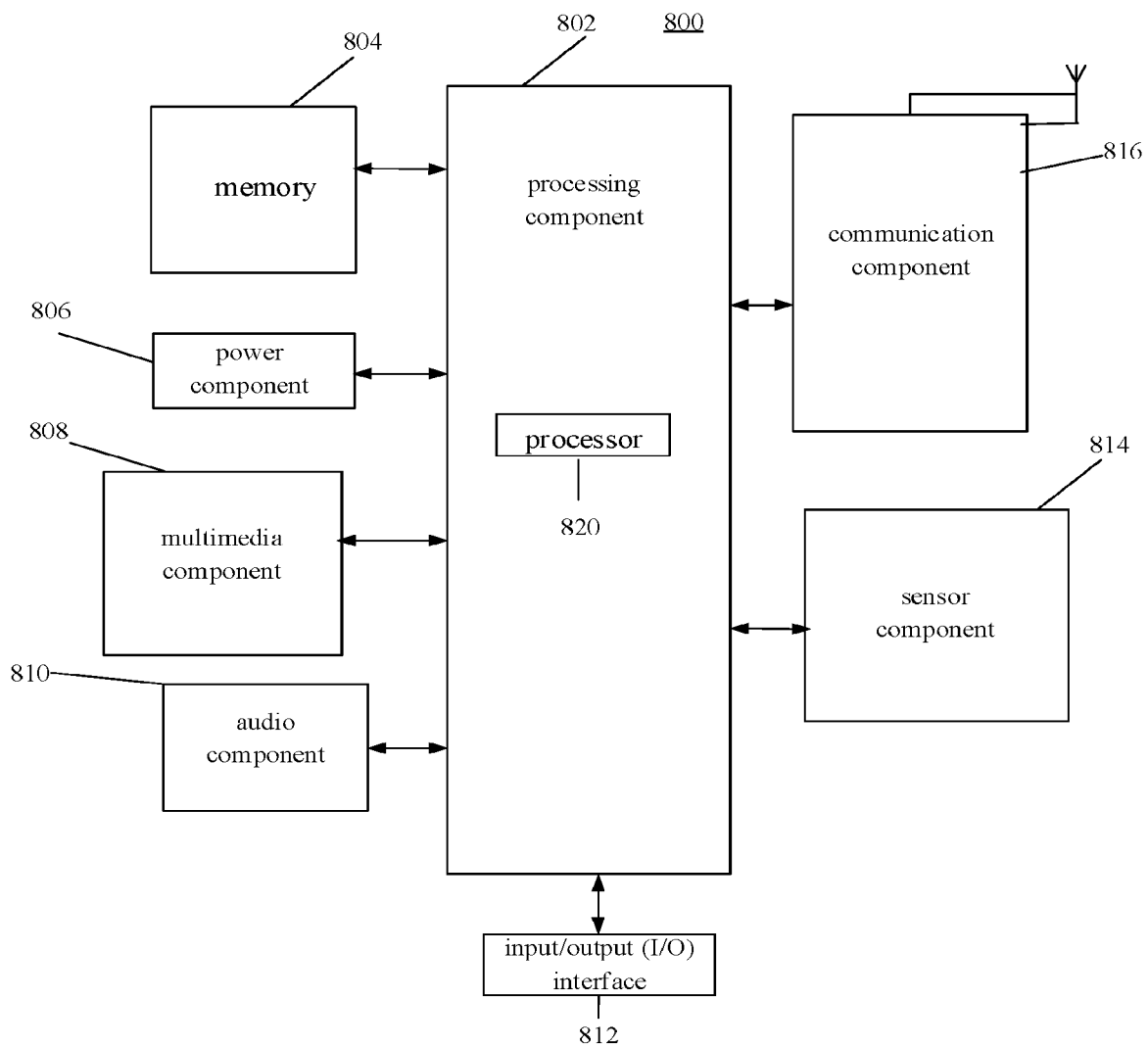
FIG. 15 is a block diagram of user equipment according to an example embodiment.

FIG. 15 is a block diagram of user equipment (UE) 800 according to an example embodiment. For example, the user equipment 800 may be a mobile phone, a computer, a digital broadcast user equipment, a messaging device, a gaming console, a tablet, a medical device, exercise equipment, a personal digital assistant, and the like.

Referring to FIG. 15, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the user equipment 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the user equipment 800. Examples of such data include instructions for any applications or methods operated on the user equipment 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the user equipment 800. The power component 806 may include a power management system, one or more power sources, and any other components associated with the generation, management, and distribution of power in the user equipment 800.

The multimedia component 808 includes a screen providing an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the user equipment 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the user equipment 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the user equipment 800. For instance, the sensor component 814 may detect an open/closed status of the user equipment 800, relative positioning of components, e.g., the display and the keypad, of the user equipment 800, a change in position of the user equipment 800 or a component of the user equipment 800, a presence or absence of user contact with the user equipment 800, an orientation or an acceleration/deceleration of the user equipment 800, and a change in temperature of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the user equipment 800 and other devices. The user equipment 800 can access a wireless network based on a communication standard, such as WiFi, 2G, or 3G, or a combination thereof. In one example embodiment, the communication component 816 receives a broadcast signal or broadcast associated information from an external broadcast management system via a broadcast channel. In one example embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the user equipment 800 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing the above described methods.

In example embodiments, there is also provided a non-transitory computer-readable storage medium including instructions, such as included in the memory 804, executable by the processor 820 in the user equipment 800, for performing the above-described methods. For example, the non-transitory computer-readable storage medium may be a ROM, a RAM, a CD-ROM, a magnetic tape, a floppy disc, an optical data storage device, and the like.

Figure 16:
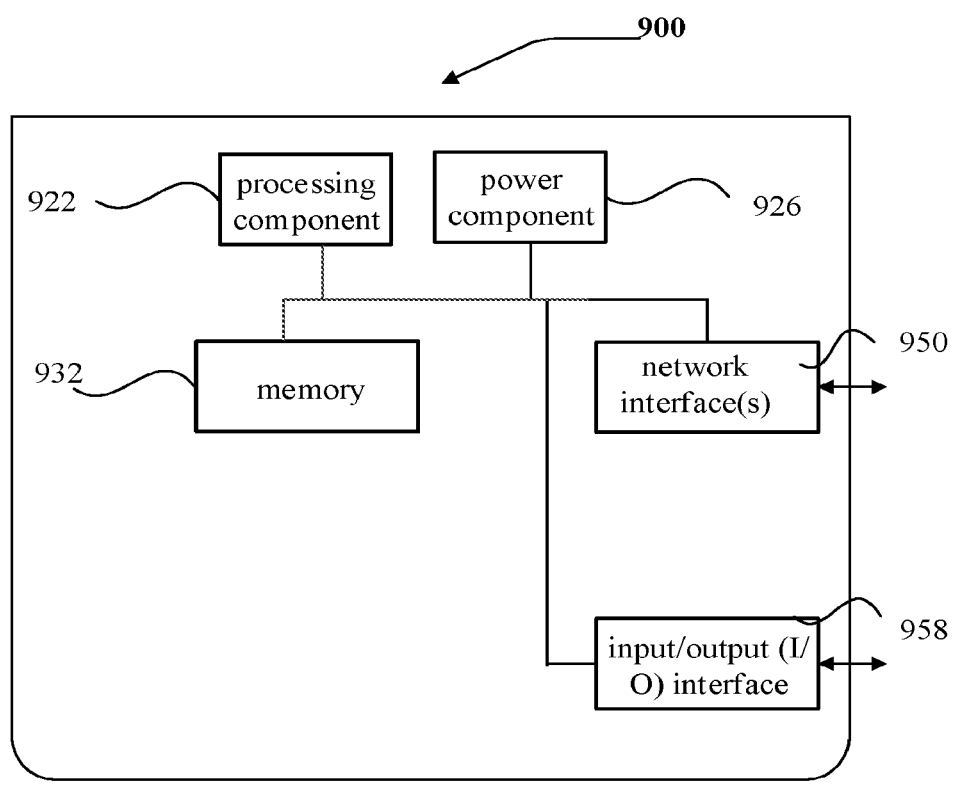
FIG. 16 is a block diagram of a base station according to an example embodiment.

FIG. 16 is a block diagram of a structure of a base station according to an example embodiment of the present disclosure. For example, the base station 900 may be provided as a network-side device. Referring to FIG. 16, the base station 900 includes a processing component 922 that further includes one or more processors, and memory resources represented by a memory 932 for storing instructions executable by the processing component 922, such as application programs. The application programs stored in the memory 932 may include one or more modules each corresponding to a set of instructions. Further, the processing component 922 is configured to execute the instructions to perform the above described methods which are applied in the base station.

The base station 900 may also include a power component 926 configured to perform power management of the base station 900, wired or wireless network interface(s) 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

According to a first aspect of embodiments of the present disclosure, there is provided an information processing method. The method is applied to a terminal and the method includes receiving, in a Discontinuous Reception (DRX) short cycle mode, Downlink Control Information (DCI) for power saving (DCP), and switching from the DRX short cycle mode to a DRX long cycle mode in response to that the DCP includes a first indication, wherein receiving of the DCP including the first indication by the terminal corresponds to that a wake up signal (WUS) corresponding to the DCP is not considered to be detected by the terminal.

In an embodiment, the method further includes entering a wake-up period of the DRX short cycle mode in response to that the DCP includes a second indication, wherein receiving of the DCP including the second indication by the terminal corresponds to that the WUS corresponding to the DCP is considered to be detected by the terminal.

In an embodiment, switching from the DRX short cycle mode to the DRX long cycle mode in response to that the DCP includes the first indication includes stopping timing of a DRX short cycle timer in response to that the DCP includes the first indication.

In an embodiment, the method further includes maintaining the DRX short cycle mode in response to being in a state of invalid monitoring of the DCP and/or in response to a failure in monitoring of the DCP. The state of invalid monitoring is a state where monitoring of the DCP is not possible.

In an embodiment, the state of invalid monitoring includes at least one of:
being in a state where an inactivity timer (IAT) is timing;
being in a state of Bandwidth Part (BWP) switching;
being in a state of measurement gap; or
being in a state where the terminal is performing random access.

In an embodiment, maintaining the DRX short cycle mode in response to being in the state of invalid monitoring of the DCP and/or in response to the failure in monitoring of the DCP includes at least one of:
entering a wake-up period of the DRX short cycle in response to being in the state of invalid monitoring of the DCP;
entering the wake-up period of the DRX short cycle in response to the failure in monitoring of the DCP;
entering the wake-up period of the DRX short cycle in response to being in the state of invalid monitoring of the DCP and the failure in monitoring of the DCP;
determining whether to enter the wake-up period of the DRX short cycle according to a configuration of power saving wake-up (ps-wakeup) in response to being in the state of invalid monitoring of the DCP;
determining whether to enter the wake-up period of the DRX short cycle according to the configuration of the ps-wakeup in response to the failure in monitoring of the DCP; or
determining whether to enter the wake-up period of the DRX short cycle according to the configuration of the ps-wakeup in response to being in the state of invalid monitoring of the DCP and the failure in monitoring of the DCP.

In an embodiment, determining whether to enter the wake-up period of the DRX short cycle according to the configuration of the ps-wakeup includes determining to enter the wake-up period of the DRX short cycle in response to that the configuration of the ps-wakeup carries a third indication, or determining to enter a sleep period of the DRX short cycle in response to that the configuration of the ps-wakeup carries a fourth indication.

In an embodiment, the method further includes receiving a function configuration of the DCP that includes a fifth indication. The fifth indication is used to indicate that the DCP including the first indication is used to control switching from the DRX short cycle mode to the DRX long cycle mode.

According to a second aspect of embodiments of the present disclosure, there is provided an information processing method. The method is applied to a base station, and the method includes sending Downlink Control Information (DCI) for power saving (DCP) to a terminal which is in a Discontinuous Reception (DRX) short cycle mode. The DCP including a first indication is used to indicate the terminal to switch from the DRX short cycle mode to a DRX long cycle mode, and receiving of the DCP including the first indication by the terminal corresponds to that a wake up signal (WUS) corresponding to the DCP is not considered to be detected by the terminal.

In an embodiment, the DCP including a second indication is used to indicate entering of a wake-up period of the DRX short cycle mode, and receiving of the DCP including the second indication by the terminal corresponds to that the WUS corresponding to the DCP is considered to be detected by the terminal.

In an embodiment, the method further includes sending a function configuration of the DCP that includes a fifth indication. The fifth indication is used to indicate that the DCP including the first indication is used to control switching from the DRX short cycle mode to the DRX long cycle mode.

According to a third aspect of embodiments of the present disclosure, there is provided an information processing device. The device is applied to a terminal, and the device includes a receiving module configured to receive, in a Discontinuous Reception (DRX) short cycle mode, Downlink Control Information (DCI) for power saving (DCP), and a switching module configured to switch from the DRX short cycle mode to a DRX long cycle mode in response to that the DCP includes a first indication, wherein receiving of the DCP including the first indication by the terminal corresponds to that a wake up signal (WUS) corresponding to the DCP is not considered to be detected by the terminal.

In an embodiment, the device further includes an entering module configured to enter a wake-up period of the DRX short cycle mode in response to that the DCP includes a second indication, wherein receiving of the DCP including the second indication by the terminal corresponds to that the WUS corresponding to the DCP is considered to be detected by the terminal.

In an embodiment, the switching module is configured to stop timing of a DRX short cycle timer in response to that the DCP includes the first indication.

In an embodiment, the device further includes: a maintaining module configured to maintain the DRX short cycle mode in response to being in a state of invalid monitoring of the DCP and/or in response to a failure in monitoring of the DCP. The state of invalid monitoring is a state where monitoring of the DCP is not possible.

In an embodiment, the maintaining module is further configured to: the state of invalid monitoring includes at least one of:
  being in a state where an inactivity timer (IAT) is timing;
  being in a state of Bandwidth Part (BWP) switching;
  being in a state of measurement gap; and
  being in a state where the terminal is performing random access.

In an embodiment, the maintaining module is further configured to: maintaining the DRX short cycle mode in response to being in the state of invalid monitoring of the DCP and/or in response to the failure in monitoring of the DCP includes at least one of:
  entering a wake-up period of the DRX short cycle in response to being in the state of invalid monitoring of the DCP;
  entering the wake-up period of the DRX short cycle in response to the failure in monitoring of the DCP;
  entering the wake-up period of the DRX short cycle in response to being in the state of invalid monitoring of the DCP and the failure in monitoring of the DCP;
  determining whether to enter the wake-up period of the DRX short cycle according to a configuration of power saving wake-up (ps-wakeup) in response to being in the state of invalid monitoring of the DCP;
  determining whether to enter the wake-up period of the DRX short cycle according to the configuration of the ps-wakeup in response to the failure in monitoring of the DCP; or
  determining whether to enter the wake-up period of the DRX short cycle according to the configuration of the ps-wakeup in response to being in the state of invalid monitoring of the DCP and the failure in monitoring of the DCP.

In an embodiment, the maintaining module is further configured to determine to enter the wake-up period of the DRX short cycle in response to that the configuration of the ps-wakeup carries a third indication, or determine to enter a sleep period of the DRX short cycle in response to that the configuration of the ps-wakeup carries a fourth indication.

In an embodiment, the receiving module is configured to receive a function configuration of the DCP that includes a fifth indication. The fifth indication is used to indicate that the DCP including the first indication is used to control switching from the DRX short cycle mode to the DRX long cycle mode.

According to a fourth aspect of embodiments of the present disclosure, there is provided an information processing device. The device is applied to a base station, and the device includes a sending module configured to send Downlink Control Information (DCI) for power saving (DCP) to a terminal which is in a Discontinuous Reception (DRX) short cycle mode. The DCP including a first indication is used to indicate the terminal to switch from the DRX short cycle mode to a DRX long cycle mode, and receiving of the DCP including the first indication by the terminal corresponds to that a wake up signal (WUS) corresponding to the DCP is not considered to be detected by the terminal.

In an embodiment, the sending module is further configured to: the DCP including a second indication is used to indicate entering of a wake-up period of the DRX short cycle mode, and receiving of the DCP including the second indication by the terminal corresponds to that the WUS corresponding to the DCP is considered to be detected by the terminal.

In an embodiment, the sending module is further configured to send a function configuration of the DCP that includes a fifth indication. The fifth indication is used to indicate that the DCP including the first indication is used to control switching from the DRX short cycle mode to the DRX long cycle mode.

According to a fifth aspect of embodiments of the present disclosure, there is provided a communication device, including a processor and a memory storing instructions executable by the processor, where the processor is configured to, when running the executable instructions, implement the method according to any one of the embodiments of the present disclosure.

According to a sixth aspect of embodiments of the present disclosure, there is provided a computer storage medium having a non-transitory computer-executable program stored thereon, wherein when the computer-executable program is executed by a processor, the processor is caused to perform the method according to any one of embodiments of the present disclosure.

In embodiments of the present disclosure, a terminal receives DCP in a DRX short cycle mode. The terminal switches from the DRX short cycle mode to a DRX long cycle mode in response to that the DCP includes a first indication. Receiving of the DCP including the first indication by the terminal corresponds to that a wake up signal (WUS) corresponding to the DCP is not considered to be detected by the terminal. In this way, in the DRX short cycle mode, when a WUS is not considered to be detected by the terminal, i.e., when there is no data transmission, the terminal can automatically switch from the DRX short cycle mode to the DRX long cycle mode based on the DCP including the first indication. As compared to the way in which the DRX short cycle mode is maintained when a WUS is not considered to be detected, the frequency for the terminal to monitor the DCP in the DRX long cycle mode is lower and the power consumption is smaller, and thus the number of times of monitoring of the DCP can be reduced when there is no data transmission, thereby reducing the power consumption of the terminal.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An information processing method, performed by a terminal, the method comprising:
   receiving, in a Discontinuous Reception (DRX) short cycle mode, Downlink Control Information (DCI) for power saving (DCP); and
   switching from the DRX short cycle mode to a DRX long cycle mode in response to that the DCP comprises a first indication, wherein receiving of the DCP comprising the first indication corresponds to that a wake up signal (WUS) corresponding to the DCP is not considered to be detected by the terminal;
   wherein the method further comprises:
   receiving a function configuration of the DCP that comprises a fifth indication;
   wherein the fifth indication is used to indicate that the DCP comprising the first indication is used to control switching from the DRX short cycle mode to the DRX long cycle mode.

2. The method according to claim 1, further comprising:
   entering a wake-up period of the DRX short cycle mode in response to that the DCP comprises a second indication, wherein receiving of the DCP comprising the second indication corresponds to that the WUS corresponding to the DCP is considered to be detected by the terminal.

3. The method according to claim 1, wherein switching from the DRX short cycle mode to the DRX long cycle mode in response to that the DCP comprises the first indication comprises:
   stopping timing of a DRX short cycle timer in response to that the DCP comprises the first indication.

4. The method according to claim 1, further comprising:
   maintaining the DRX short cycle mode in response to at least one of being in a state of invalid monitoring of the DCP or a failure in monitoring of the DCP;
   wherein the state of invalid monitoring is a state where monitoring of the DCP is not possible.

5. The method according to claim 4, wherein the state of invalid monitoring comprises at least one of:
   being in a state where an inactivity timer (IAT) is timing;
   being in a state of Bandwidth Part (BWP) switching;
   being in a state of measurement gap; or
   being in a state where the terminal is performing random access.

6. The method according to claim 4, wherein maintaining the DRX short cycle mode in response to at least one of being in the state of invalid monitoring of the DCP or the failure in monitoring of the DCP comprises at least one of:
   entering a wake-up period of the DRX short cycle in response to being in the state of invalid monitoring of the DCP;
   entering the wake-up period of the DRX short cycle in response to the failure in monitoring of the DCP;
   entering the wake-up period of the DRX short cycle in response to being in the state of invalid monitoring of the DCP and the failure in monitoring of the DCP;
   determining whether to enter the wake-up period of the DRX short cycle according to a configuration of power saving wake-up (ps-wakeup) in response to being in the state of invalid monitoring of the DCP;
   determining whether to enter the wake-up period of the DRX short cycle according to the configuration of the ps-wakeup in response to the failure in monitoring of the DCP; or
   determining whether to enter the wake-up period of the DRX short cycle according to the configuration of the ps-wakeup in response to being in the state of invalid monitoring of the DCP and the failure in monitoring of the DCP.

7. The method according to claim 6, wherein determining whether to enter the wake-up period of the DRX short cycle according to the configuration of the ps-wakeup comprises:
   determining to enter the wake-up period of the DRX short cycle in response to that the configuration of the ps-wakeup carries a third indication;
   or
   determining to enter a sleep period of the DRX short cycle in response to that the configuration of the ps-wakeup carries a fourth indication.

8. An information processing method, performed by a base station, the method comprising:
   sending Downlink Control Information (DCI) for power saving (DCP) to a terminal which is in a Discontinuous Reception (DRX) short cycle mode;
   wherein the DCP comprising a first indication is used to indicate the terminal to switch from the DRX short cycle mode to a DRX long cycle mode, and receiving of the DCP comprising the first indication by the terminal corresponds to that a wake up signal (WUS) corresponding to the DCP is not considered to be detected by the terminal;
   wherein the method further comprises:
   sending a function configuration of the DCP that comprises a fifth indication;
   wherein the fifth indication is used to indicate that the DCP comprising the first indication is used to control switching from the DRX short cycle mode to the DRX long cycle mode.

9. The method according to claim 8, wherein the DCP comprising a second indication is used to indicate entering of a wake-up period of the DRX short cycle mode, and receiving of the DCP comprising the second indication by the terminal corresponds to that the WUS corresponding to the DCP is considered to be detected by the terminal.

10. A base station, configured to implement the method of claim 8, comprising:
    a processor; and
    a memory, configured to store instructions executable by the processor.

11. A terminal, the device comprising:
    a processor; and
    a memory, configured to store instructions executable by the processor;

wherein the processor is configured to:
receive, in a Discontinuous Reception (DRX) short cycle mode, Downlink Control Information (DCI) for power saving (DCP); and
switch from the DRX short cycle mode to a DRX long cycle mode in response to that the DCP comprises a first indication, wherein receiving of the DCP comprising the first indication corresponds to that a wake up signal (WUS) corresponding to the DCP is not considered to be detected by the terminal;
wherein the processor is further configured to:
receive a function configuration of the DCP that comprises a fifth indication;
wherein the fifth indication is used to indicate that the DCP comprising the first indication is used to control switching from the DRX short cycle mode to the DRX long cycle mode.

12. The terminal according to claim 11, wherein the processor is further configured to:
enter a wake-up period of the DRX short cycle mode in response to that the DCP comprises a second indication, wherein receiving of the DCP comprising the second indication corresponds to that the WUS corresponding to the DCP is considered to be detected by the terminal.

13. The terminal according to claim 11, wherein the processor is further configured to:
stop timing of a DRX short cycle timer in response to that the DCP comprises the first indication.

14. The terminal according to claim 11, wherein the processor is further configured to:
maintain the DRX short cycle mode in response to at least one of being in a state of invalid monitoring of the DCP or a failure in monitoring of the DCP;
wherein the state of invalid monitoring is a state where monitoring of the DCP is not possible.

15. The terminal according to claim 14, wherein the state of invalid monitoring comprises at least one of:
being in a state where an inactivity timer (IAT) is timing;
being in a state of Bandwidth Part (BWP) switching;
being in a state of measurement gap; or
being in a state where the terminal is performing random access.

16. The terminal according to claim 14, wherein maintaining the DRX short cycle mode in response to at least one of being in the state of invalid monitoring of the DCP or the failure in monitoring of the DCP comprises at least one of:
entering a wake-up period of the DRX short cycle in response to being in the state of invalid monitoring of the DCP;
entering the wake-up period of the DRX short cycle in response to the failure in monitoring of the DCP;
entering the wake-up period of the DRX short cycle in response to being in the state of invalid monitoring of the DCP and the failure in monitoring of the DCP;
determining whether to enter the wake-up period of the DRX short cycle according to a configuration of power saving wake-up (ps-wakeup) in response to being in the state of invalid monitoring of the DCP;
determining whether to enter the wake-up period of the DRX short cycle according to the configuration of the ps-wakeup in response to the failure in monitoring of the DCP;
determining whether to enter the wake-up period of the DRX short cycle according to the configuration of the ps-wakeup in response to being in the state of invalid monitoring of the DCP and the failure in monitoring of the DCP.

17. The terminal according to claim 16, wherein the processor is further configured to:
determine to enter the wake-up period of the DRX short cycle in response to that the configuration of the ps-wakeup carries a third indication;
or
determine to enter a sleep period of the DRX short cycle in response to that the configuration of the ps-wakeup carries a fourth indication.

* * * * *